United States Patent [19]

Nam et al.

[11] Patent Number: 5,786,928
[45] Date of Patent: Jul. 28, 1998

[54] THIN FILM ACTUATED MIRROR ARRAY IN AN OPTICAL PROJECTION SYSTEM AND METHOD FOR MANUFACTURING THE SAME

[75] Inventors: Yun-Woo Nam; Sang-Chol Jung, both of Seoul, Rep. of Korea

[73] Assignee: Daewoo Electronics Co., Ltd., Rep. of Korea

[21] Appl. No.: 791,556

[22] Filed: Jan. 31, 1997

[30] Foreign Application Priority Data

Aug. 13, 1996 [KR] Rep. of Korea ............ 96-33605
Aug. 13, 1996 [KR] Rep. of Korea ............ 96-33606

[51] Int. Cl.⁶ ........................................ G02B 26/00
[52] U.S. Cl. ................................ 359/295; 359/850
[58] Field of Search ...................... 359/290, 291, 359/295, 846, 847, 848, 849, 850, 851, 212, 213, 214, 223, 224

[56] References Cited

U.S. PATENT DOCUMENTS 5,126,836  6/1992  Um ........................................ 359/618
5,469,302  11/1995 Lim ....................................... 359/291
5,604,623  2/1997  Ji et al. ................................ 359/295

Primary Examiner—Georgia Y. Epps
Assistant Examiner—Dawn-Marie Bey
Attorney, Agent, or Firm—Cushman Darby & Cushman Intellectual Property Group of Pillsbury Madison & Sutro, LLP

[57] ABSTRACT

Thin film AMA in an optical projection system and a method for manufacturing the same are disclosed. The thin film AMA has a substrate having an electrical wiring and a connecting terminal, an actuator formed on the substrate, and a reflecting member formed on the actuator. The actuator has a plurality of actuating portions in which adjacent actuating portions are actuated in opponent directions one after another, so the reflecting member installed on the actuator has large tilting angle. Therefore, the light efficiency of the light reflected by reflecting member increases and the contrast of the picture projected onto a screen also increases. Furthermore, the distance between a light source and the screen is wider because the tilting angle of the reflecting member is bigger.

27 Claims, 21 Drawing Sheets

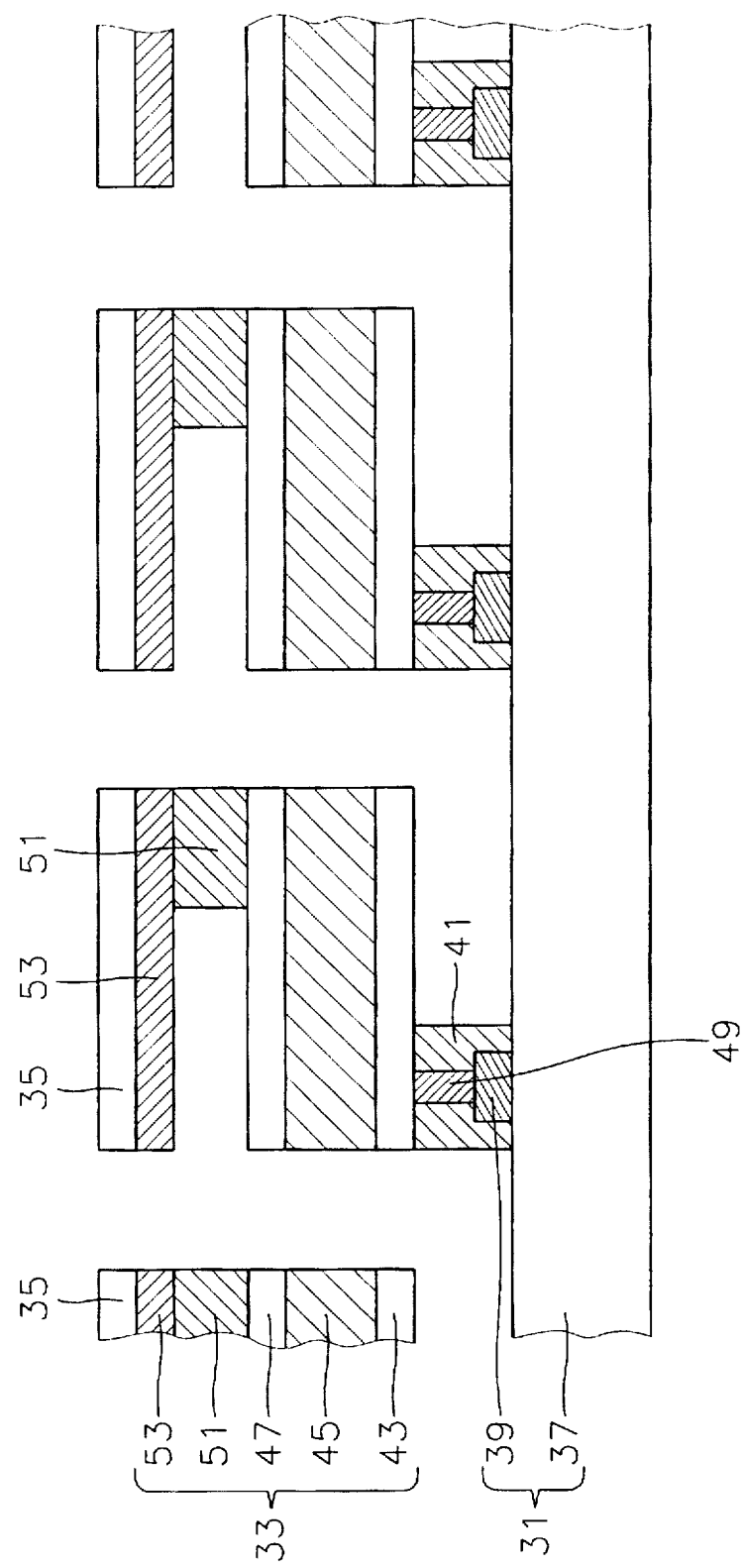

5,786,928

THIN FILM ACTUATED MIRROR ARRAY IN AN OPTICAL PROJECTION SYSTEM AND METHOD FOR MANUFACTURING THE SAME

BACKGROUND OF THE INVENTION

The present invention relates to a thin film actuated mirror array in an optical projection system and to a method for manufacturing the same, and more particularly to a thin film actuated mirror array in an optical projection system having a reflecting member and an actuator having a plurality of actuating portions in which adjacent actuating portions are actuated in opposite directions one after another, so the reflecting member installed on the actuator has a large tilting angle, and to a method for manufacturing the same.

In general, light modulators are divided into two groups according to their optics. One type is a direct light modulator such as a cathode ray tube (CRT), the other type is a transmissive light modulator such as a liquid crystal display (LCD). The CRT produce superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. At the present time, the DMD has a light efficiency of about 5%, the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from a light source 1 passes a first slit 3 and a first lens 5 and is divided into red, green, and blue lights according to the Red●Green●Blue (R●G●B) system of color representation. After the divided red, green, and blue lights are respectively reflected by a first mirror 7, a second mirror 9, and a third mirror 11, the reflected light is respectively incident on AMA devices 13, 15 and 17 corresponding to the mirrors 7, 9 and, 11. The AMA devices 13, 15 and 17 tilt mirrors installed therein, so the incident light is reflected by mirrors. In this case, mirrors installed in the AMA devices 13, 15 and 17 are tilted according to the deformation of active layers formed under mirrors. The light reflected by the AMA devices 13, 15 and 17 pass a second lens 19 and a second slit 21 and form a picture on a screen (not shown) by using projection lens 23.

The AMA is generally divided into bulk type AMA and thin film type AMA. The bulk type AMA is disclosed in U.S. Pat. No. 5,469,302 (issued to Dae-Young Lim). In the bulk type AMA, after a ceramic wafer which is composed of multilayer ceramics inserted into metal electrodes therein, is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA manufactured by using semiconductor technology has been developed.

The thin film AMA is disclosed at U.S. Ser. No. 08/336, 021, entitled "THIN FILM ACTUATED MIRROR ARRAY USED IN AN OPTICAL PROJECTION SYSTEM AND METHOD FOR THE MANUFACTURE THEREOF", which is now pending in USPTO and is subject to an obligation to the assignee of this application.

FIG. 2 shows a cross sectional view of the thin film AMA. Referring to FIG. 2, the thin film AMA has an active matrix 31, an actuator 33 formed on the active matrix 31, and a mirror 35 installed on the actuator 33. The active matrix 31 has a substrate 37, M×N (M, N are integers) number of transistors (not shown) which are installed in the substrate 37, and M×N (wherein M, N are integers) number of connecting terminals 39 respectively formed on the transistors.

The actuator 33 has a supporting member 41 formed on the active matrix 31 which includes the connecting terminal 39, a first electrode 43 having a bottom of first portion thereof attached to the supporting member 41 and having a second portion parallelly formed about the active matrix 31, a conduit 49 formed in the supporting member 41 so as to connect connecting terminal 39 to the first electrode 43, an active layer 45 formed on the first electrode 43, a second electrode 47 formed on the active layer 45, a spacing member 51 formed at first portion of the second electrode 47, and a supporting layer 53 having a bottom of first portion thereof attached to the spacing member 51 and having a second portion parallelly formed about the second electrode 47. The mirror 35 is installed on the supporting layer 53.

A manufacturing method of the thin film AMA will be described below. FIGS. 3A to 3D illustrate manufacturing steps of the thin film AMA. In FIGS. 3A to 3D, the same reference numerals are used for the same elements in FIG. 2.

Referring to FIG. 3A, at first, the active matrix 31 which includes the substrate 37 in which M×N number of transistors (not shown) are formed and M×N number of connecting terminals 39 respectively formed on the transistors is provided. Subsequently, after a first sacrificial layer 55 is formed on the active matrix 31, the first sacrificial layer 55 is patterned to expose a portion of the active matrix 31 where the connecting terminal 39 is formed. The first sacrificial layer 55 can be removed by using etching or chemicals.

Referring to FIG. 3B, the supporting member 41 is formed on the exposed portion of the active matrix 31 by a sputtering method or a chemical vapor deposition (CVD) method. Next, after a hole is formed through supporting member 41, the conduit 49 is formed in the supporting member 41 by filling the hole with an electrically conductive material, for example tungsten (W). The conduit 49 electrically connects the connecting terminal 49 to the first electrode 43 successively formed. The first electrode 43 is formed on the supporting member 41 and on the first sacrificial layer 55 by using an electrically conductive material such as gold (Au) or silver (Ag). The active layer 45 is formed on the first electrode 43 by using a piezoelectric material, for example lead zirconate titanate (PZT). The second electrode 47 is formed on the active layer 45 by using an electrically conductive material such as gold (Au) or silver (Ag).

The transistor installed in the active matrix 31 converts a picture signal which is caused by an incident light from a light source into a signal current. The signal current is applied to the first electrode 43 through the connecting terminal 39 and the conduit 49. At the same time, a bias current from a common line (not shown) formed on the bottom of the active matrix 31 is applied to the second electrode 47, so an electric field is generated between the second electrode 47 and the first electrode 43. The active layer 45 formed between the second electrode 47 and the first electrode 43 is actuated according to the electric field.

Referring to FIG. 3C, after a second sacrificial layer 57 is formed on the second electrode 47, the second sacrificial layer 57 is patterned to expose a portion of the second electrode 47 adjacent to a portion under which the supporting member 41 is formed. After the spacing member 51 is formed at the exposed portion, the supporting layer 53 is formed on the second sacrificial layer 57 and on the spacing member 51. Also, the mirror 35 for reflecting the incident light is formed on the supporting layer 53.

Referring to FIG. 3D, the mirror 35, the supporting layer 53, the second electrode 47, the active layer 45 and the first electrode 43 are patterned one after another so that M×N number of pixels having predetermined shapes are formed. Consequently, after the first sacrificial layer 55 and the second sacrificial layer 57 are removed, pixels are rinsed and dried in order to complete the thin film AMA.

However, in the above-described thin film AMA, the tilting angle of the actuator installed therein is limited because the actuator having one active layer which is deformed in order to reflect the incident light from a light source by using the mirror mounted on the actuator. So, the light efficiency of the light reflected by the mirror is decreased and the contrast of the picture projected onto a screen also is decreased. In addition, the distance between the light source and the screen is narrower due to the limited tilting angle of the actuator.

SUMMARY OF THE INVENTION

Accordingly, considering the problems as described above, it is a first object of the present invention to provide a thin film actuated mirror array in an optical projection system having a reflecting member and an actuator including a plurality of actuating portions in which adjacent actuating portions are actuated in the opposite directions one after another so as to increase the tilting angle of reflecting member installed on the actuator even though the thin film actuated mirror array has a small volume.

Also, it is a second object of the present invention to provide a method for manufacturing the above thin film actuated mirror array in an optical projection system.

To accomplish the above first object, there is provided in the present invention a thin film actuated mirror array in an optical projection system being actuated by a first signal and a second signal. The thin film actuated mirror array in an optical projection system has a substrate, an actuator formed on the substrate, and a reflecting member formed on the actuator.

The substrate has an electrical wiring and a connecting terminal for receiving the first signal from outside and for transmitting the first signal. The actuator has a first actuating portion and a second actuating portion.

The first actuating portion has a first bottom electrode formed on the substrate for receiving the first signal, a first top electrode corresponding to the first bottom electrode for receiving the second signal and generating an electric field between the first top electrode and the first bottom electrode, a first active layer formed between the first top electrode and the first bottom electrode and deformed by the electric field, and a bottom supporting layer formed beneath the first bottom electrode.

The second actuating portion connected to the first actuating portion has a second bottom electrode integrally formed with the first bottom electrode, a second top electrode corresponding to the second bottom electrode for receiving the second signal and generating an electric field between the second top electrode and the second bottom electrode, a second active layer formed between the second top electrode and the second bottom electrode and deformed by the electric field, and a top supporting layer formed on the second top electrode.

The second actuating portion is actuated in an opposite direction from the first actuating portion. The second top electrode is integrally formed with the first top electrode and the second active layer is integrally formed with the first active layer.

The reflecting member is formed on the second actuating portion for reflecting a light.

The first bottom electrode and the second bottom electrode are comprised of an electrically conductive metal and the first active layer and the second active layer are comprised of a piezoelectric material or an electrostrictive material. The first top electrode and the second top electrode are comprised of an electrically conductive metal.

Preferably, the first bottom electrode and the second bottom electrode are comprised of platinum, tantalum, or platinum-tantalum. The first active layer and the second active layer may be comprised of $Pb(Zr, Ti)O_3$, $(Pb, La)(Zr, Ti)O_3$, or $Pb(Mn, Nb)O_3$ and the first top electrode and the second top electrode may be comprised of aluminum, platinum, or silver.

Preferably, the first active layer and the second active layer are comprised of ZnO.

The bottom supporting layer and the top supporting layer are comprised of a rigid material, for example a metal or a nitride.

The second actuating portion further has a post formed on a portion of the top supporting layer for supporting the reflecting member. The reflecting member is comprised of a reflective metal, for example aluminum, platinum, or silver.

Preferably, the actuator has a U-shape.

In order to accomplish the above second object, there is provided in the present invention a method for manufacturing a thin film actuated mirror array in an optical projection system being actuated by a first signal and a second signal. The method for manufacturing the thin film actuated mirror array in an optical projection system comprises the steps of:

providing a substrate having an electrical wiring and a connecting terminal for receiving a first signal from outside and transmitting the first signal;

forming a first supporting layer on the substrate and patterning the first supporting layer to form a bottom supporting layer on a first portion of the substrate;

forming a bottom electrode layer, an active layer, and a top electrode layer on the bottom supporting layer and on the substrate;

patterning the top electrode layer to form a first top electrode for receiving the second signal and generating an electric field and to from a second top electrode for receiving the second signal and generating an electric field;

patterning the active layer to form a first active layer deformed by the electric field and to form a second active layer deformed by the electric field;

patterning the bottom electrode layer to form a first bottom electrode on the bottom supporting layer for receiving the first signal and to form a second bottom electrode on a second portion of the substrate for receiving the first signal;

forming a second supporting layer on the second top electrode above the second portion of the substrate and patterning the second supporting layer to form a top supporting layer on the second top electrode; and forming a reflecting member for reflecting a light on the top supporting layer.

The step of forming the first supporting layer is preferably performed after forming a sacrificial layer on the substrate and patterning the sacrificial layer in order to expose a portion of the substrate being adjacent to the connecting terminal. The step of forming the sacrificial layer may further comprise the step of planarizing the sacrificial layer by using a spin on glass or by a chemical mechanical polishing method.

The steps of forming the first supporting layer and the second supporting layer are performed by a chemical vapor deposition method by using a metal or a nitride. The steps of forming the bottom electrode layer and the top electrode layer may be performed by a sputtering method or a chemical vapor deposition method by using platinum, tantalum or platinum-tantalum.

The step of forming the active layer may be performed by a sol-gel method, a sputtering method, or a chemical vapor deposition method by using ZnO, $Pb(Zr, Ti)O_3$, $(Pb, La)(Zr, Ti)O_3$, or $Pb(Mn, Nb)O_3$. The step of forming the reflecting member may be performed by a sputtering method or a chemical vapor deposition method by using aluminum, platinum, or silver.

In the thin film AMA according to the present invention, the first signal, that is the picture current signal, is applied to the first bottom electrode via the connecting terminal and the electrical wiring. The first signal is also applied to the second bottom electrode connected to the first bottom electrode. At the same time, the second signal, that is the bias current signal, is applied to the first top electrode from the common line and the second signal is also applied to the second top electrode connected to the first electrode. Thus, electric fields are respectively generated between the first top electrode and the first bottom electrode, and between the second top electrode and the second bottom electrode. The first active layer which is formed between the first top electrode and the first bottom electrode, and the second active layer which is formed between the second top electrode and the second bottom electrode, are deformed by electric fields. The first active layer and the second active layer are respectively deformed in a direction perpendicular to electric fields. In this case, the first active layer is actuated in the opponent direction to the position where the bottom supporting layer is positioned. The second active layer is actuated in the opponent direction to the position where the top supporting layer is positioned. That is, the first active layer is actuated upward and the second active layer is actuated downward. The tilting angle of the first active layer is equal to that of the second active layer.

If the tilting angle of the first active layer is $\theta$, the first actuating portion having the first active layer is actuated upward by a tilting angle of $\theta$. Also, the second actuating portion having the second active layer is actuated downward by a tilting angle of $\theta$. When the first actuating portion is actuated upward, the second actuating portion connected to the first actuating portion is actuated upward together with the first actuating portion. At this state, the second actuating portion having the second active layer is actuated downward by a tilting angle of $\theta$ because the second active layer is actuated downward. Therefore, the final tilting angle of the second actuating portion is equal to $2\theta$. The reflecting member for reflecting an incident light from a light source tilts by an angle of $2\theta$ because the reflecting member is formed on the second actuating portion.

Therefore, the thin film AMA in an optical projection system according to the present invention has a reflecting member and actuator including a plurality of actuating portions in which adjacent actuating portions are actuated in opposite directions one after another, so the tilting angle of reflecting members mounted on actuators is two or three times bigger than that of the conventional thin film AMA, even though the thin film AMA according to the present invention has a small volume. Hence, the light efficiency of the light reflected by the reflecting member increases and the contrast of the picture projected onto a screen also increases. Furthermore, the distance between the light source and the screen is wider because the tilting angle of the reflecting member is bigger.

BRIEF DESCRIPTION OF THE DRAWINGS

The above objects and advantages of the present invention will become more apparent by describing in detail preferred embodiments thereof with reference to the attached drawings, in which:

FIGS. 3A to 3D illustrate manufacturing steps of the thin film AMA illustrated in FIG. 2;

DETAILED DESCRIPTION OF THE INVENTION

Hereinafter, the preferred embodiments of the present invention will be explained in more detail with reference to the accompanying drawings.

Embodiment 1

Figure 1:
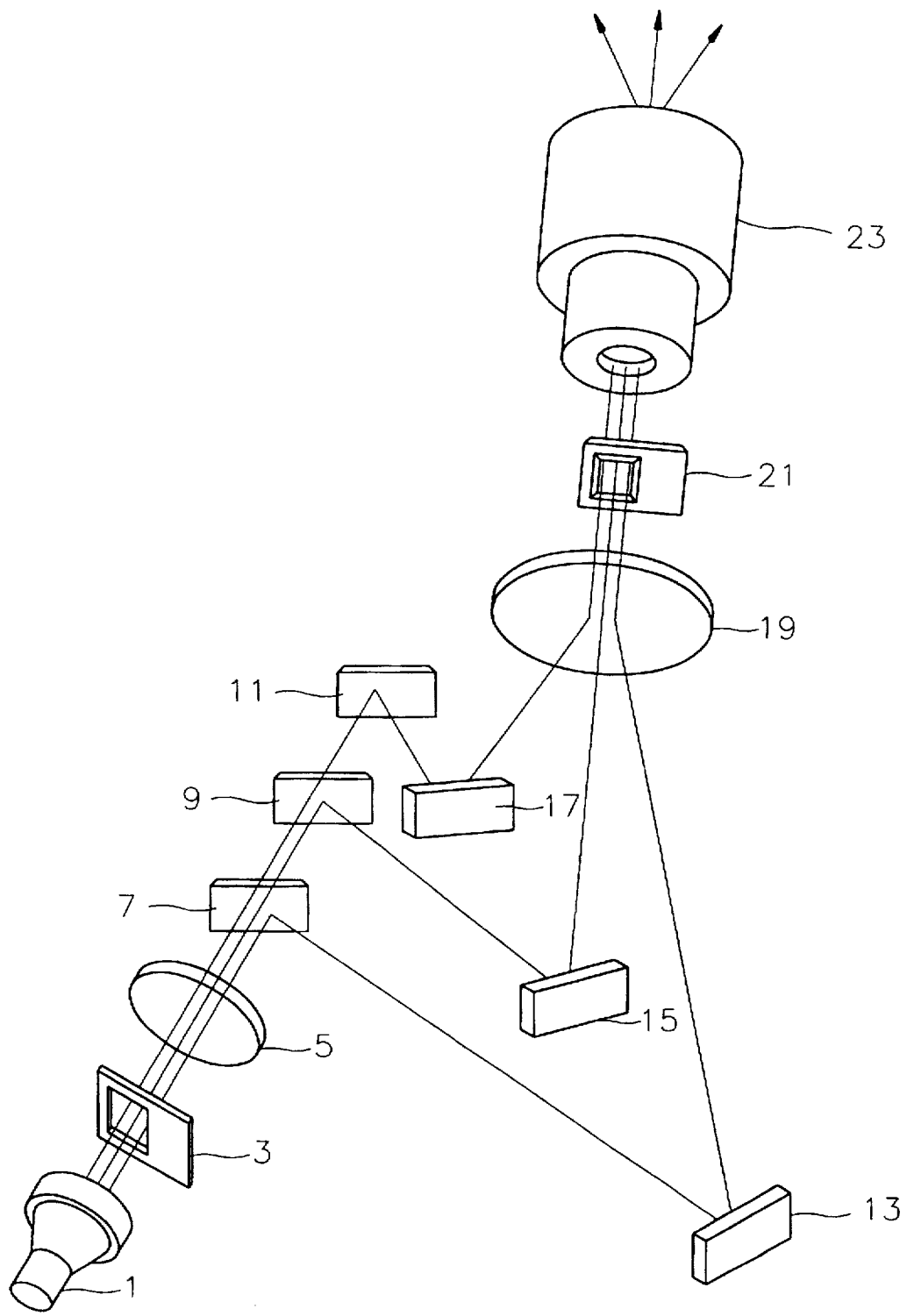
FIG. 1 is a schematic view for showing an engine system of a conventional AMA.
Figure 2:
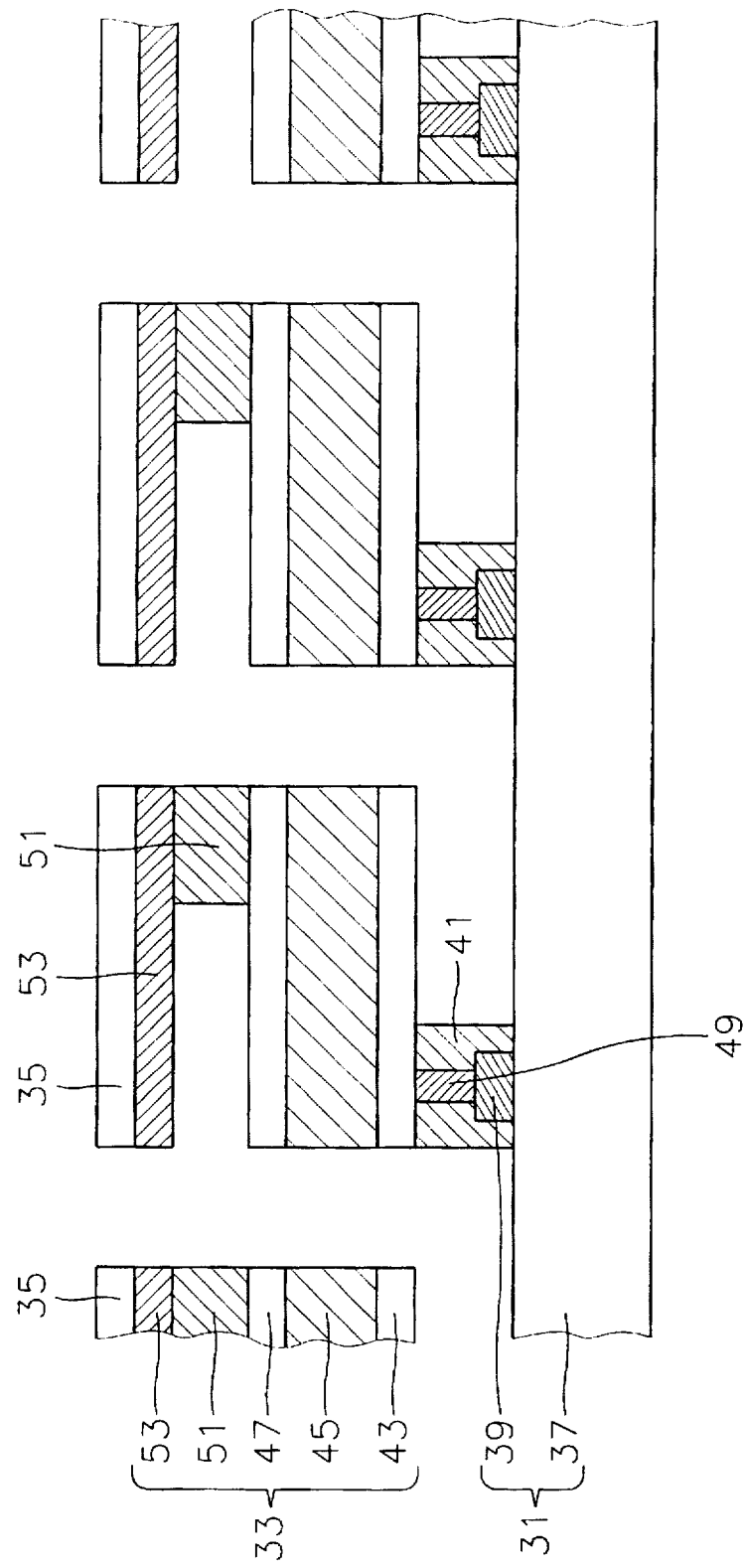
FIG. 2 is a cross sectional view for showing a thin film AMA disclosed in a prior application of the assignee of this application.
Figure 3A:
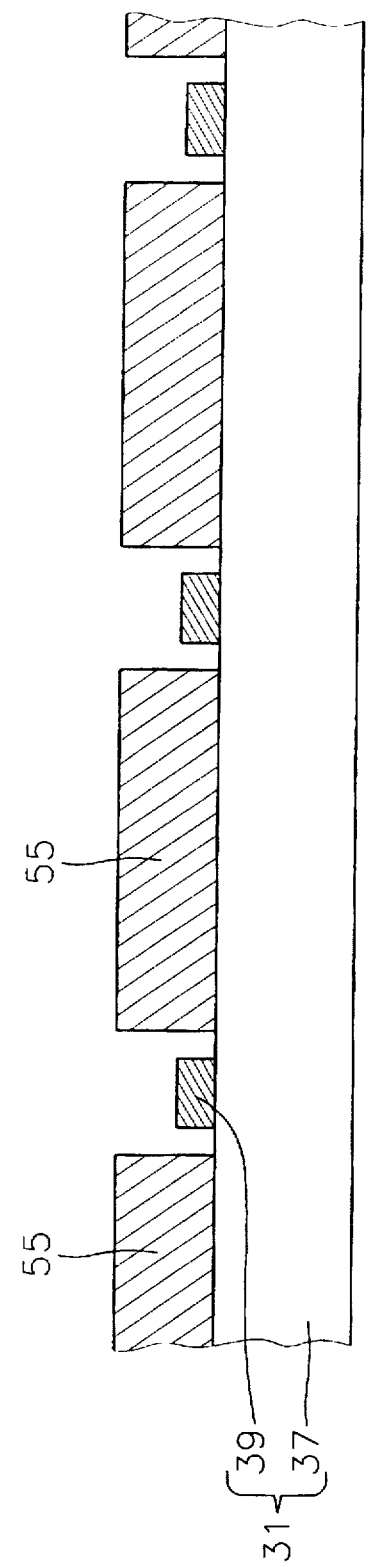
Figure 3B:
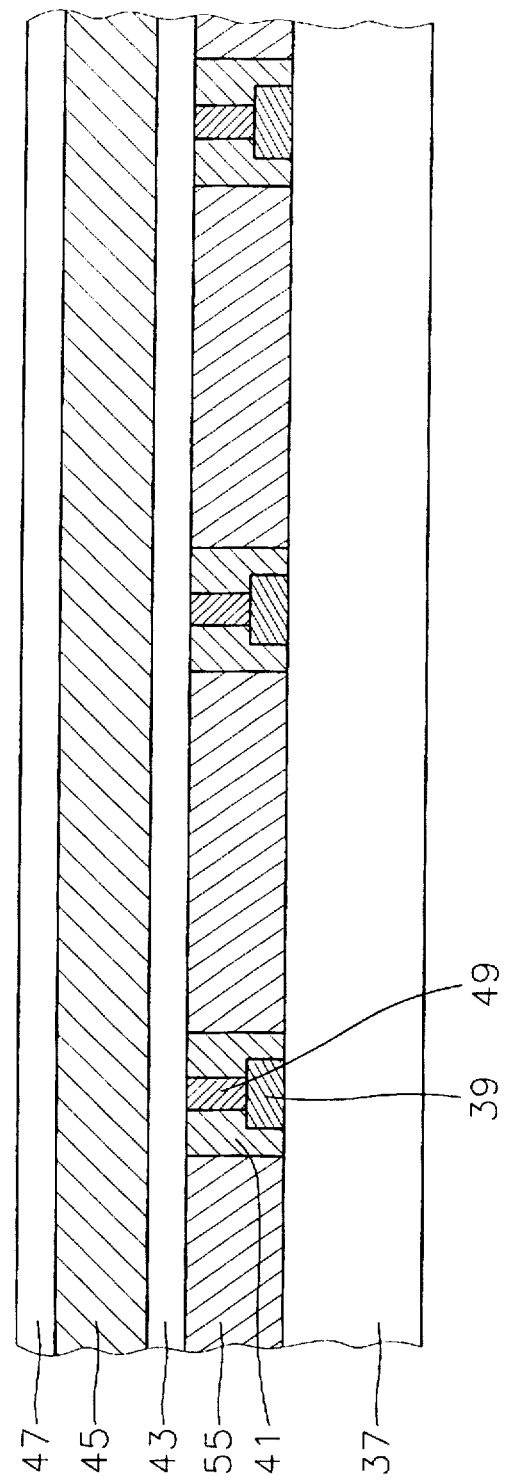
Figure 3C:
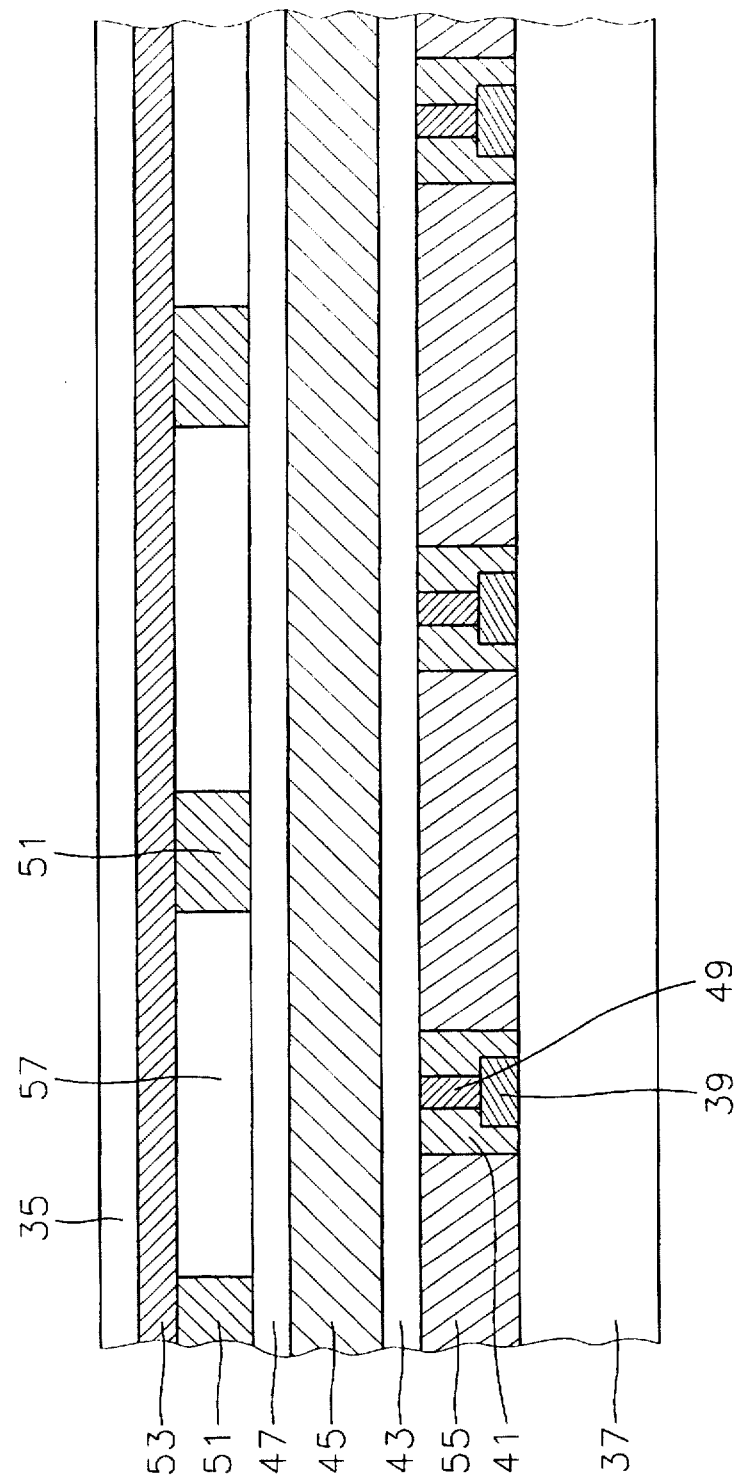
Figure 4:
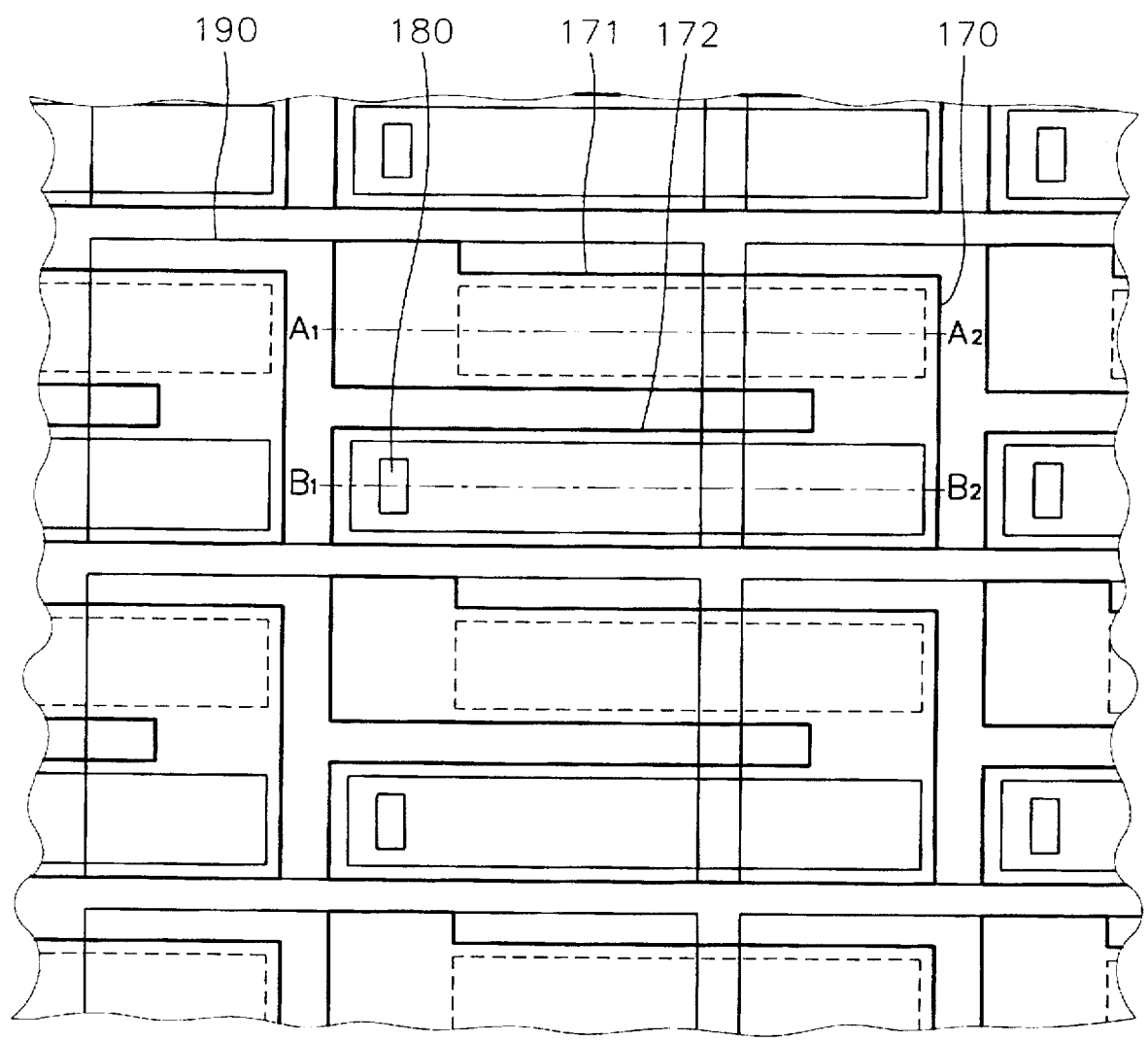
FIG. 4 is a plan view for showing a thin film AMA in an optical projection system according to a first embodiment of the present invention.
Figure 5:
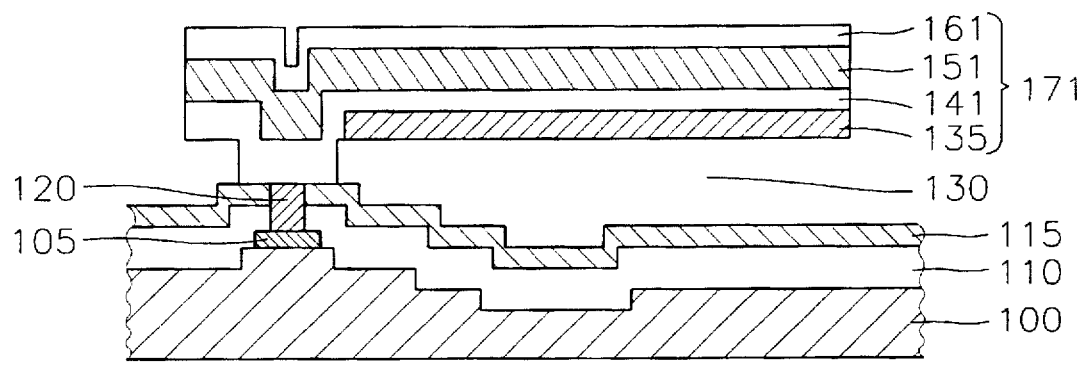
FIG. 5 is a cross sectional view taken along line $A_1$–$A_2$ of FIG. 4.
Figure 6:
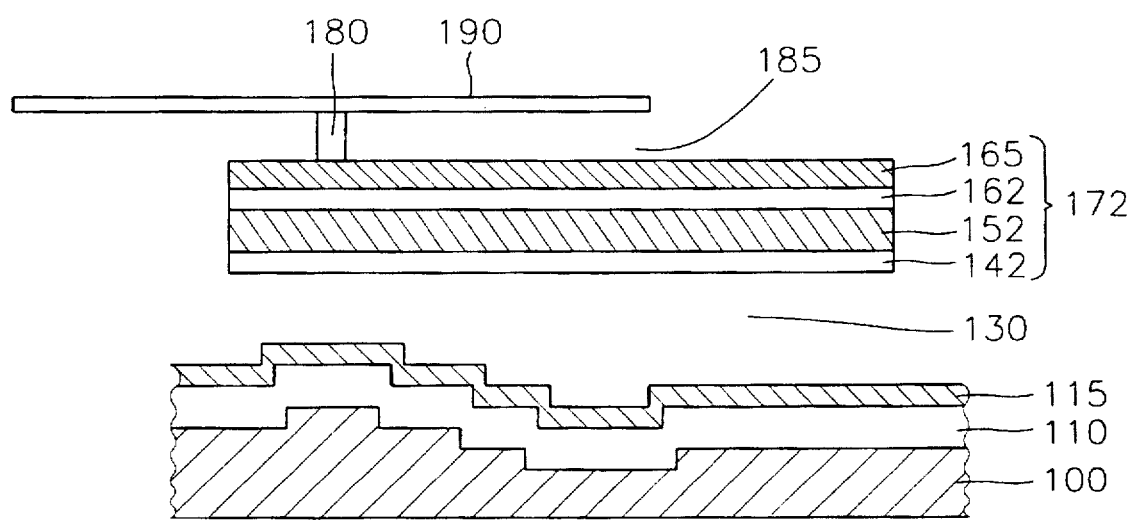
FIG. 6 is a cross sectional view taken along line $B_1$–$B_2$ of FIG. 4.

FIG. 4 is a plan view for showing a thin film AMA in an optical projection system according to a first embodiment of the present invention. FIG. 5 is a cross sectional view taken along line $A_1$–$A_2$ of FIG. 4, and FIG. 6 is a cross sectional view taken along line $B_1$–$B_2$ of FIG. 4.

Referring to FIG. 4, the thin film AMA in an optical projection system according to the present embodiment, has a substrate 100, an actuator 170 formed on the substrate 100, and a reflecting member 190 installed on the actuator 170.

The actuator 170 has a first actuating portion 171 formed on a first portion of the substrate 100 and a second actuating portion 172 formed above a second portion of the substrate 100. The second actuating portion 172 is integrally formed with the first actuating portion 171. The first actuating portion 171 has a rectangular shape and the second actuating portion 172 has an L-shape. So, the actuator 170 having the first actuating portion 171 and the second actuating portion 172 has a U-shape.

The reflecting member 190 is supported by a post 180 formed on a first potion of the second actuating portion 172. The actuator 170 is covered with the reflecting member 190. Preferably, the reflecting member 190 is a mirror.

Referring to FIG. 5, the substrate 100 on which an electrical wiring (not shown) is formed has a connecting terminal 105 formed on the electrical wiring, a passivation layer 110 overlayed on the substrate 100 and on the connecting terminal 105, an etch stop layer 115 overlayed on the passivation layer 110, and a plug 120 formed from the etch stop layer 115 to the connecting terminal 105 through the passivation layer 110.

The first actuating portion 171 has a first bottom electrode 141 having a bottom of a first portion attached to the portion of the etch stop layer 115 under which the plug 120 and the connecting terminal 105 are formed and having a second portion parallely formed above the etch stop layer 115, a bottom supporting layer 135 attached to the bottom of the second portion of the first bottom electrode 141, a first active layer 151 formed on the first bottom electrode 141, and a first top electrode 161 formed on the first active layer 151. A first air gap 130 is interposed between the etch stop layer 115 and the second portion of the first bottom electrode 141.

Referring to FIG. 6, the second actuating portion 172 has a second bottom electrode 142 is parallely formed above the etch stop layer 115, a second active layer 152 formed on the second bottom electrode 142, a second top electrode 162 formed on the second active layer, and a top supporting layer 165 formed on the second top electrode 162. The first air gap 130 is interposed between the etch stop layer 115 and the second bottom electrode 142. The second bottom electrode 142 of the second actuating portion 172 is integrally formed with the first bottom electrode 141 of the first actuating portion 171 and the second active layer 152 of the second actuating portion 172 is integrally formed with the first active layer 151 of the first actuating portion 171. Also, the second top electrode 162 of the second actuating portion 172 is integrally formed with the first top electrode 161 of the first actuating portion 171.

The post 180 is formed on a first portion of the top supporting layer 165 of the second actuating portion 172. A central portion of the reflecting member 190 is supported by the post 180. A first portion of the reflecting member 190 is parallely formed above the top supporting layer 165. A second air gap 185 is interposed between the top supporting layer 165 and the first portion of the reflecting member 190. A second portion of the reflecting member 190 covers partially a portion of adjacent actuator. Preferably, the reflecting member 190 has a rectangular shape.

A method for manufacturing the thin film AMA in an optical projection system according to the present embodiment will be described as follows.

FIGS. 7 to 11 illustrate manufacturing steps of the thin film AMA according to the present embodiment.

Figure 7:
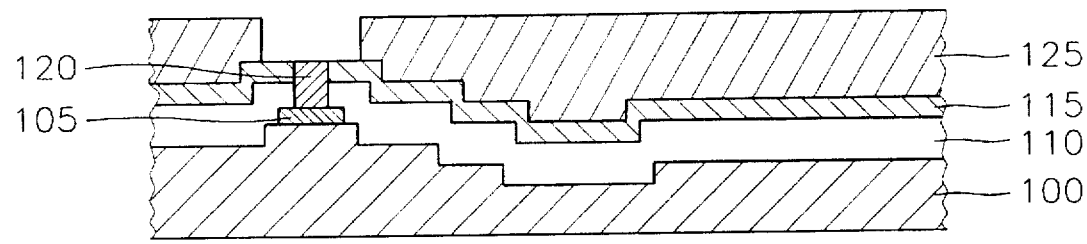
FIGS. 7 to 11 illustrate manufacturing steps of the thin film AMA in an optical projection system according to the first embodiment of the present invention.

Referring to FIG. 7, the connecting terminal 105 corresponding to the electrical wiring (not shown) is formed on the substrate 100. Preferably, the electrical wiring has a metal oxide semiconductor (MOS) transistor for switching operation. The connecting terminal 105 is formed by using a metal, for example tungsten (W). The electrical wiring and the connecting terminal 105 receive a first signal from out side and transmit the first signal to the first bottom electrode 141 and to the second bottom electrode 142. The first signal is a picture current signal.

The passivation layer 110 is overlayed on the connecting terminal 105 and on the substrate 100 by using phosphor-silicate glass (PSG). The passivation layer 110 is formed by a chemical vapor deposition (CVD) method so that the passivation layer 110 have a thickness of between about 1.0 µm and 2.0 µm. The passivation layer 110 protects the substrate 100 having the electrical wiring and the connecting terminal 105 during subsequent manufacturing steps.

The etch stop layer 115 is overlayed on the passivation layer 110 by using a nitride so that the etch stop layer 115 has a thickness of between about 1000 Å and 2000 Å. The etch stop layer 115 is formed by a low pressure chemical vapor deposition (LPCVD) method. The etch stop layer 115 protects the passivation layer 110 and the substrate 100 during successive etching steps.

After portions of the etch stop layer 115 and the passivation layer 110 are etched from a portion of the etch stop layer where the connecting terminal 105 is formed, the plug 120 is formed in portions of the etch stop layer 115 and the passivation layer 110 by using an electrically conductive metal such as tungsten or titanium (Ti). The plug 120 is formed by a sputtering method or a CVD method. The plug 120 is electrically connected to the connecting terminal 105. Thus, the first signal is applied to the first bottom electrode 141 and to the second bottom electrode 142 which are successively formed through the connecting terminal 105 and the plug 120 from the electrical wiring.

A sacrificial layer 125 is overlayed on the etch stop layer 115 and on the plug 120 by using PSG. The sacrificial layer 125 is formed by an atmospheric pressure CVD (APCVD) method so that the sacrificial layer 125 has a thickness of between about 1.0 µm and 2.0 µm. In this case, the degree of flatness of the sacrificial layer 125 is poor because the sacrificial layer 125 covers the top of the substrate 100 having the electrical wiring and the connecting terminal 105. Therefore, the surface of the sacrificial layer 125 is planarized by using a spin-on-glass (SOG) or by a chemical mechanical polishing (CMP) method. Subsequently, a first portion of the sacrificial layer 125 under which the connecting terminal 105 is formed, is patterned in order to expose a portion of the etch stop layer 115 where the plug 120 is formed.

Figure 8:
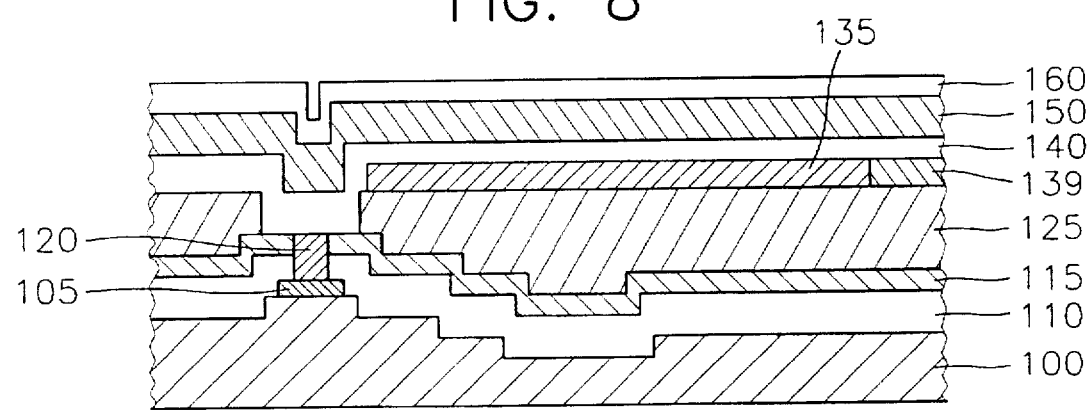

Referring to FIG. 8, after a first photo resist 139 is coated on the sacrificial layer 125, the first photo resist 139 is patterned so as to expose a second portion of the sacrificial layer 125 which is adjacent to the exposed portion of the etch stop layer 115. After a first supporting layer is formed on the second portion of the sacrificial layer 125 by using a rigid material, for example a nitride or a metal, the first supporting layer is patterned in order to form the bottom supporting layer 135. The first supporting layer is formed by a LPCVD method so that the first supporting layer has a thickness of between about 0.1 µm and 1.0 µm. When the first supporting layer is patterned, the bottom supporting layer 135 is formed only beneath the first bottom electrode 141 which is successively formed by means of exact patterning the first supporting layer.

A bottom electrode layer 140 is overlayed on the exposed portion of the etch stop layer 115, on the bottom supporting layer 135, and on the sacrificial layer 125. The bottom electrode layer 140 is formed by using an electrically conductive metal such as platinum (Pt), tantalum (Ta), or platinum-tantalum (Pt-Ta). The bottom electrode layer 140 is formed by a sputtering method or a CVD method so that the bottom electrode layer 140 has a thickness of between about 500 Å and 2000 Å. The bottom electrode layer 140 will be patterned so as to form the first bottom electrode 141 and the second bottom electrode 142.

An active layer 150 is overlayed on the bottom electrode layer 140. The active layer 150 is formed by using a piezoelectric material such as ZnO, PZT (Pb(Zr, Ti)O$_3$), or PLZT ((Pb, La)(Zr, Ti)O$_3$) so that the active layer 150 has a thickness of between about 0.1 µm and 1.0 µm. Also, the active layer 150 is formed by using an electrostrictive material such as PMN (Pb(Mg, Nb)O$_3$). When the active layer 150 is manufactured by using ZnO, the active layer 150 is formed at low temperature of between 300° C. and 600° C. Hence, a thermal attack in the substrate 100 may be decrease. After the active layer 150 is formed by a sol-gel method, a sputtering method, or a CVD method, the active layer 150 is annealed by a rapid thermal annealing (RTA) method. Then, the active layer 150 is polled. In this case, the polling step is needless when the active layer 150 is manufactured by using ZnO because the active layer 150 comprised of ZnO is polled by an electric field generated according to the first signal and a second signal. The active layer 150 will be patterned so as to form the first active layer 151 and the second active layer 152.

A top electrode layer 160 is overlayed on the active layer 150. The top electrode layer 160 is formed by using an electrically conductive and reflective metal, for example aluminum (Al), platinum, or silver (Ag). The top electrode layer 160 is formed by a sputtering method or a CVD method so that the top electrode layer 160 has a thickness of between about 500 Å and 2000 Å. The top electrode layer 160 is patterned so as to form the first top electrode 161 and the second top electrode 162.

Figure 9:
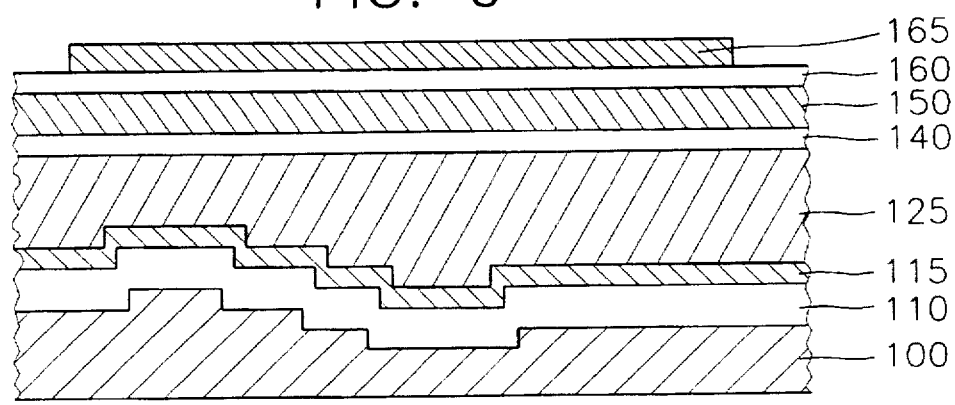

Referring to FIG. 9, after a second supporting layer is overlayed on the top electrode layer 160 by using a rigid material such as a nitride or a metal, the second supporting layer is patterned in order to form the top supporting layer 165. In this case, the top supporting layer 165 is patterned as regard to the position where the second top electrode 162 which is formed successively by patterning the top electrode layer 160.

Figure 10A:
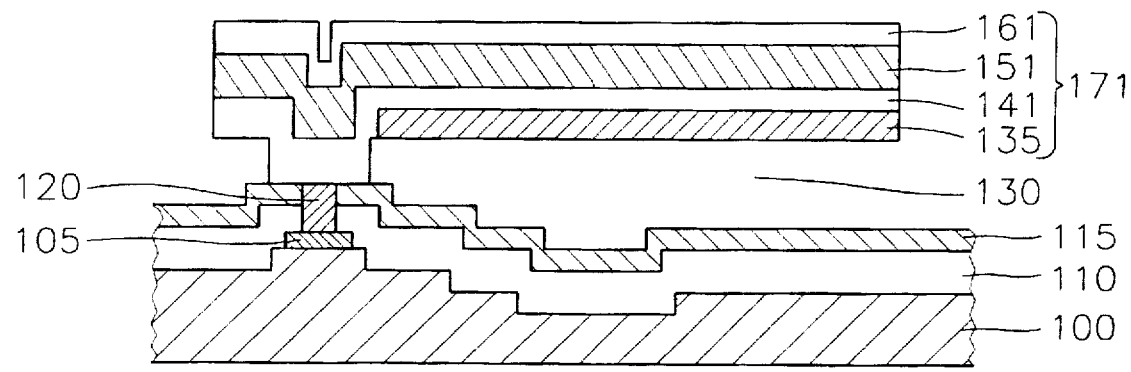
Figure 10B:
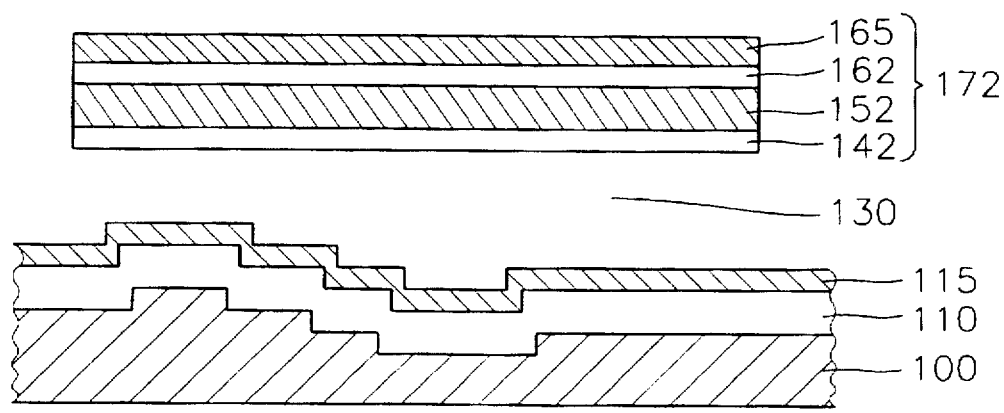

FIG. 10A illustrates manufacturing steps of the first actuating portion 171 and FIG. 10B illustrates manufacturing steps of the second actuating portion 172.

Referring to FIGS. 10A and 10B, after a second photo resist (not shown) is coated on the top electrode layer 160 and on the top supporting layer 165, the top electrode layer 160 is patterned so as to form the first top electrode 161 and the second top electrode 162 by using the second photo resist as an etching mask. At that time, the first top electrode 161 and the second top electrode 162 are connected to each other. Namely, the first top electrode 161 has a rectangular shape and the second top electrode 162 has an L-shape so that the first top electrode 161 and the second top electrode 162 together have a U-shape. The second signal is applied to the first top electrode 161 and to the second top electrode 162 from a common line (not shown). The second signal is a bias current signal.

The active layer 160 and the bottom electrode layer 140 are patterned by the same method as that of the top electrode layer 160. The active layer 160 is patterned so as to form the first active layer 151 and the second active layer 152. The first active layer 151 and the second active layer 152 respectively have the same shape as those of the first top electrode 161 and the second top electrode 162. The bottom electrode layer 140 is patterned so as to form the first bottom electrode 141 and the second bottom electrode 142. The first bottom electrode 141 and the second bottom electrode 142 also respectively have the same shape as those of the first top electrode 161 and the second top electrode 162. The first signal is applied to the first bottom electrode 141 and to the second bottom electrode 142 via the connecting terminal 105, the plug 120, and the electrical wiring. Therefore, when the first signal is applied to the first bottom electrode 141 and to the second bottom electrode 142, at the same time, the second signal is applied to the first top electrode 161 and to the second top electrode 162, electric fields are respectively generated between the first top electrode 161 and the first bottom electrode 141, and between the second top electrode 162 and the second bottom electrode 142. The first active layer 151 and the second active layer 152 are respectively deformed by such electric fields.

Subsequently, the sacrificial layer 125 and the first photo resist 139 are removed by using a vapor of hydrogen fluoride (HF). When the sacrificial layer 125 and the first photo resist 139 are removed, the first air gap 130 is formed at the position where the sacrificial layer 125 is positioned. Hence, the first actuating portion 171 and the second actuating portion 172 are completed.

Figure 11:
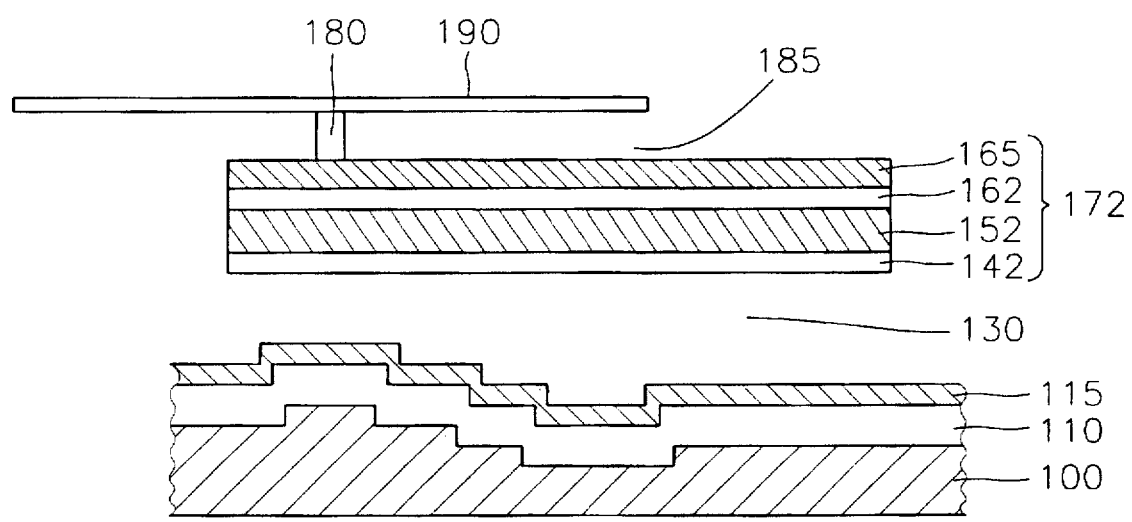

FIG. 11 illustrates manufacturing steps for forming the reflecting member 190 on the second actuating portion 172 shown in FIG. 10B.

Referring to FIG. 11, after a third photo resist (not shown) is coated on the first actuating portion 171 and on the second actuating portion 172, the third photo resist is patterned in order to expose a portion of the top supporting layer 165. The post 180 is formed on the exposed portion of the top supporting layer 165 and the reflecting member 190 is formed on the post 180 and on the third photo resist. The post 180 and the reflecting member 190 are formed by using a metal having a reflectivity such as aluminum, platinum, or silver. The post 180 and the reflecting member 190 are formed by a sputtering method or a CVD method. The reflecting member 190 has a thickness of between about 500 Å and 1000 Å. Preferably, the reflecting member 190 is a mirror. Consequently, the third photo resist is removed by etching. When the third photo resist is removed, the second air gap 185 is formed at the position where the third photo resist is positioned. The reflecting member 190 has a shape of plate whose central portion is supported by the post 180. The first portion of the reflecting member 190 is parallely formed above the top supporting layer 165. The second air gap 185 is interposed between the top supporting layer 165 and the first portion of the reflecting member 190. The second portion of the reflecting member 190 is formed to cover the adjacent actuator. Hence, the actuator 170 on which the reflecting member 190 is formed is completed.

The operation of the thin film AMA in an optical projection system according to the present embodiment will be described.

In the thin film AMA according to the present embodiment, the first signal, that is the picture current signal, is applied to the first bottom electrode 141 via the connecting terminal 105, the plug 120, and the electrical wiring. The first signal is also applied to the second bottom electrode 142 connected to the first bottom electrode 141. At the same time, the second signal, that is the bias current signal, is applied to the first top electrode 161 from the common line and the second signal is also applied to the second top electrode 162 connected to the first electrode 161. Thus, electric fields are respectively generated between the first top electrode 161 and the first bottom electrode 141, and between the second top electrode 162 and the second bottom electrode 142. The first active layer 151 which is formed between the first top electrode 161 and the first bottom electrode 141, and the second active layer 152 which is formed between the second top electrode 162 and the second bottom electrode 142, are deformed by electric fields. The first active layer 151 and the second active layer 152 are respectively deformed in a direction perpendicular to electric fields. In this case, the first active layer 151 is actuated in a direction away from the position where the bottom supporting layer 135 is positioned. The second active layer 152 is actuated in a direction away from the position where the top supporting layer 165 is positioned. That is, the first active layer 151 is actuated upward and the second active layer 152 is actuated downward. The tilting angle of the first active layer 151 is equal to that of the second active layer 152.

If the tilting angle of the first active layer 151 is θ, the first actuating portion 171 having the first active layer 151 is actuated upward by a tilting angle of θ. Also, the second actuating portion 172 having the second active layer 152 is actuated downward by a tilting angle of θ. When the first actuating portion 171 is actuated upward, the second actuating portion 172 connected to the first actuating portion 171 is actuated upward together with the first actuating portion 171. At this state, the second actuating portion 172 having the second active layer 152 is actuated downward by a tilting angle of θ because the second active layer 162 is actuated downward. Therefore, the final tilting angle of the second actuating portion 172 is equal to 2 θ. The reflecting member 190 for reflecting an incident light from a light source tilts by an angle of 2 θ because the reflecting member 190 is formed on the second actuating portion 172.

Embodiment 2

Figure 12:
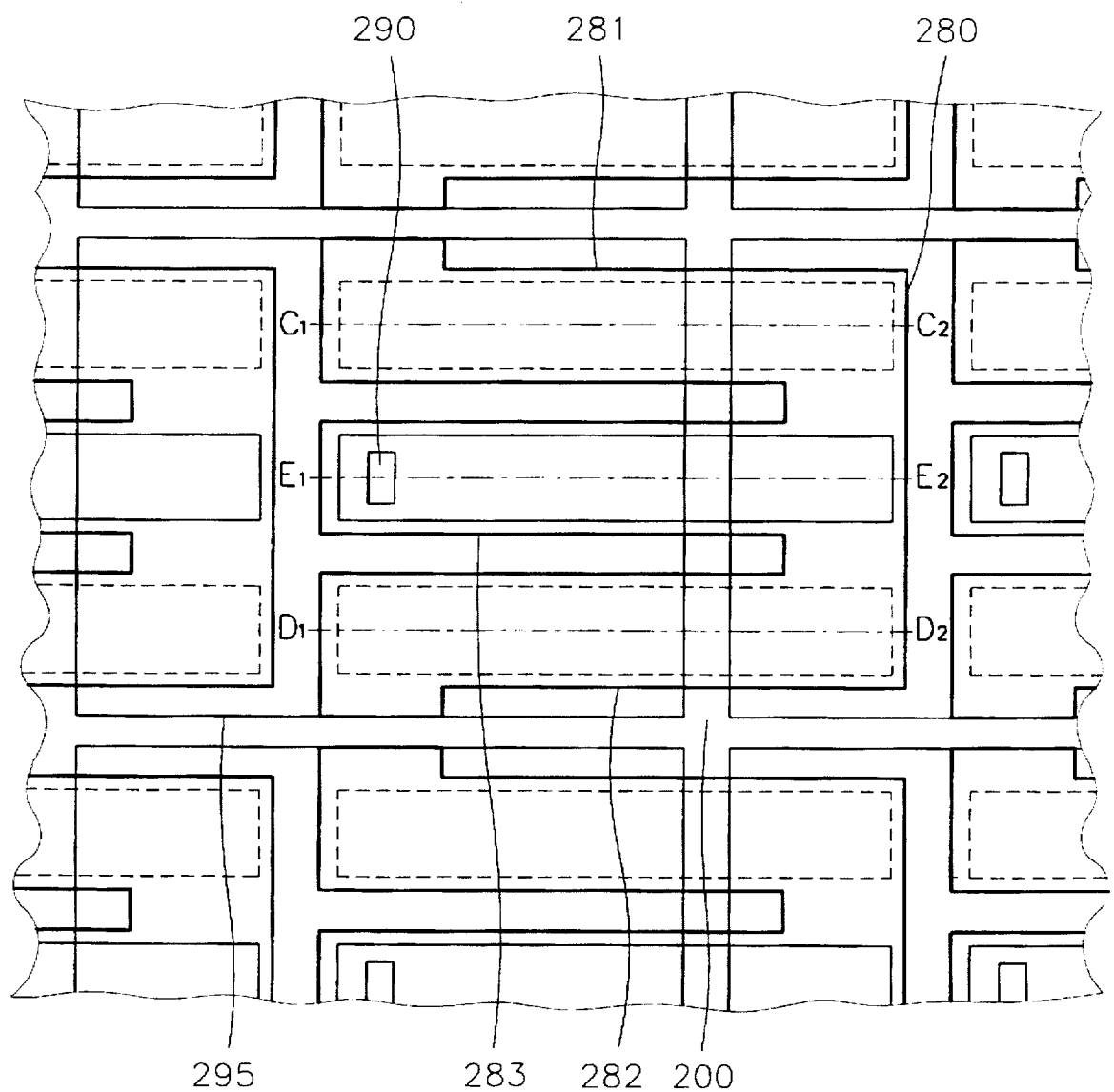
FIG. 12 is a plan view for showing a thin film AMA in an optical projection system according to a second embodiment of the present invention.
Figure 13:
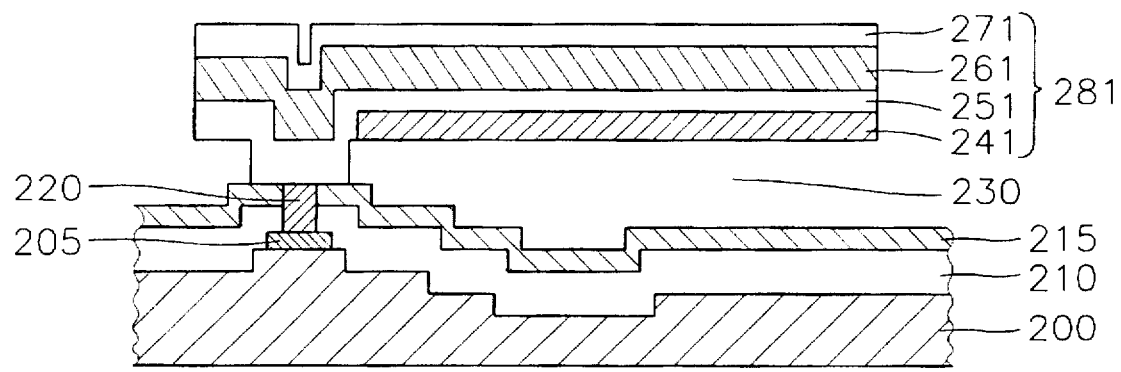
FIG. 13 is a cross sectional view taken along line $C_1$–$C_2$ of FIG. 12.
Figure 14:
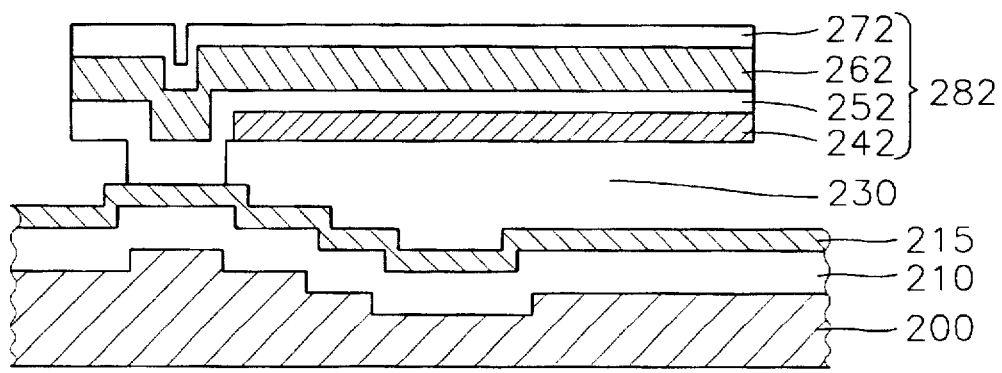
FIG. 14 is a cross sectional view taken along line $D_1$–$D_2$ of FIG. 12.
Figure 15:
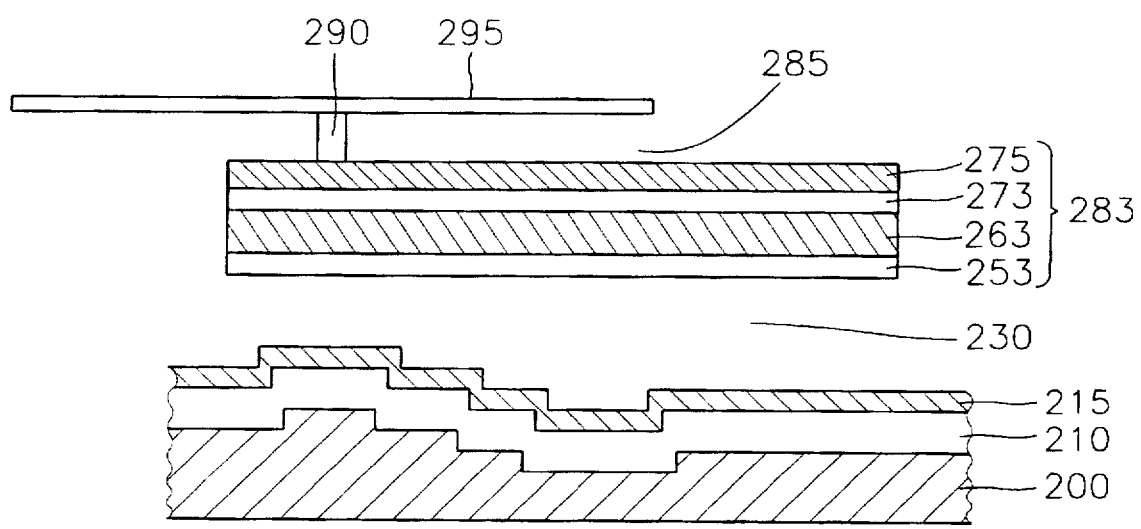
FIG. 15 is a cross sectional view taken along line $E_1$–$E_2$ of FIG. 12.

FIG. 12 is a plan view for showing a thin film AMA in an optical projection system according to a second embodiment of the present invention. FIG. 13 is a cross sectional view taken along line $C_1$–$C_2$ of FIG. 12. FIG. 14 is a cross sectional view taken along line $D_1$–$D_2$ of FIG. 12, and FIG. 15 is a cross sectional view taken along line $E_1$–$E_2$ of FIG. 12.

Referring to FIG. 12, the thin film AMA in an optical projection system according to the present embodiment has an substrate 200, an actuator 280 formed on the substrate 200, and a reflecting member 295 installed on the actuator 280.

The actuator 280 has a first actuating portion 281 formed on a first portion of the substrate 200, a second actuating portion 282 formed on a second portion of the substrate 200, and a third actuating portion 283 integrally formed with the first actuating portion 281 and with the second actuating portion 282 between the first actuating portion 281 and the second actuating portion 282.

The first actuating portion 281 and the second actuating portion 282 are formed parallel to each other, and the third actuating portion 283 having a T-shape is connected to the first actuating portion 281 and to the second actuating portion 282. Thus, the actuator 280 having the first actuating portion 281, the second actuating portion 282, and the third actuating portion 283, has a shape of two U's parallelly combined.

The reflecting member 295 is supported by a post 280 formed on a first potion of the third actuating portion 283. The actuator 280 is covered with the reflecting member 295. Preferably, the reflecting member 295 is a mirror.

Referring to FIG. 13, the substrate 200 in which an electrical wiring (not shown) is formed has a connecting terminal 205 formed on the electrical wiring, a passivation layer 210 overlayed on the substrate 200 and on the connecting terminal 205, an etch stop layer 215 overlayed on the passivation layer 210, and a plug 220 formed from the etch stop layer 215 to the connecting terminal 205 through the passivation layer 210. Preferably, the electrical wiring has a MOS transistor for switching operation.

The first actuating portion 281 has a first bottom electrode 251 having a bottom of a first portion attached to a portion of the etch stop layer 215 having the plug 220 and the connecting terminal 205 are formed thereunder and having a second portion parallely formed above the etch stop layer 215, a first bottom supporting layer 241 attached to the bottom of the second portion of the first bottom electrode 251, a first active layer 261 formed on the first bottom electrode 251, and a first top electrode 271 formed on the first active layer 261. A first air gap 230 is interposed between the etch stop layer 215 and the second portion of the first bottom electrode 251.

The second actuating portion 282 has the same shape as that of the first actuating portion 281 except a position where a second bottom electrode 252 is attached to the etch stop layer 215. Referring to FIG. 14, the second actuating portion 282 has a second bottom electrode 252 having a bottom of a first portion attached to a portion of the etch stop layer 215 adjacent to the portion under which the plug 220 and the connecting terminal 205 are formed and having a second portion parallely formed above the etch stop layer 215, a second bottom supporting layer 242 attached to the bottom of the second portion of the second bottom electrode 252, a second active layer 262 formed on the second bottom electrode 252, and a second top electrode 272 formed on the second active layer 262. The first air gap 230 is interposed between the etch stop layer 215 and the second portion of the second bottom electrode 252.

Referring to FIG. 15, the third actuating portion 283 has a third bottom electrode 253 parallely formed above the etch stop layer 215, a third active layer 263 formed on the third bottom electrode 253, a third top electrode 273 formed on the third active layer 263, and a top supporting layer 275 formed on the third top electrode 273. The third bottom electrode 253 of the third actuating portion 283 is integrally formed with the first bottom electrode 251 and with the second bottom electrode 252, and the third active layer 263 of the third actuating portion 283 is integrally formed with the first active layer 261 and with the second active layer 262. Also, the third top electrode 273 of the third actuating portion 283 is integrally formed with the first top electrode 271 and with the second top electrode 272. The first air gap 230 also is interposed between the etch stop layer 215 and the third bottom electrode 253.

The post 290 is formed on a portion of the top supporting layer 275 of the third actuating portion 283. A central portion of the reflecting member 295 is supported by the post 290. A first portion of the reflecting member 295 is parallel to the top supporting layer 275. A second air gap 285 is interposed between the top supporting layer 275 and the first portion of the reflecting member 295. A second portion of the reflecting member 295 covers a portion of adjacent actuator. Preferably, the reflecting member 295 has a rectangular shape.

A method for manufacturing the thin film AMA in an optical projection system according to the second embodiment of the present invention will be described as follows.

FIGS. 16 to 18C illustrate manufacturing steps of the thin film AMA according to the present embodiment.

Figure 16:
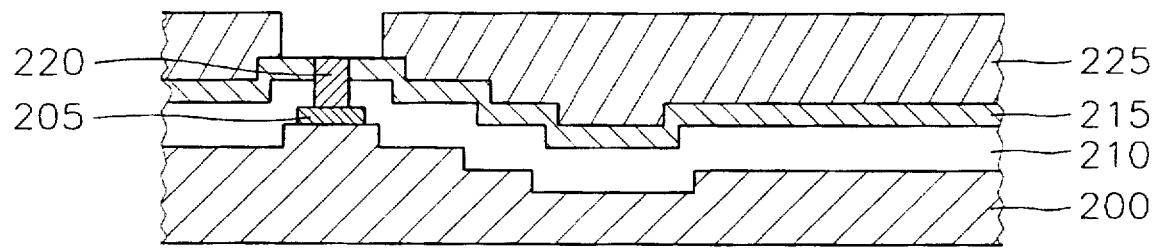
FIG. 16 to FIG. 18C illustrate manufacturing steps of the thin film AMA in an optical projection system according to the second embodiment of the present invention.

Referring to FIG. 16, the connecting terminal 205 corresponding to the electrical wiring (not shown) is formed on the substrate 200 in which the electrical wiring is formed. The connecting terminal 205 is formed by using a metal, for example tungsten. The connecting terminal 205 is electrically connected to the electrical wiring. The electrical wiring and the connecting terminal 205 receive a first signal from outside and transmit the first signal to the first bottom electrode 251, to the second bottom electrode 252, and to the third bottom electrode 253. The first signal is a picture current signal.

The passivation layer 210 is overlayed on the connecting terminal 205 and on the substrate 200 by using PSG. The passivation layer 210 is formed by a CVD method so that the passivation layer 210 has a thickness of between about 1.0 μm and 2.0 μm. The passivation layer 210 protects the substrate 200 having the electrical wiring and the connecting terminal 205 during successive manufacturing steps.

The etch stop layer 215 is overlayed on the passivation layer 210 by using a nitride so that the etch stop layer 215 has a thickness of between about 1000 Å and 2000 Å. The etch stop layer 215 is formed by a LPCVD method. The etch stop layer 215 protects the passivation layer 210 and the substrate 200 during subsequent etching steps.

After portions of the etch stop layer 215 and the passivation layer 210 are etched from a portion of the etch stop layer 215 having the connecting terminal 205 is formed thereunder, the plug 220 is formed in portions of the etch stop layer 215 and the passivation layer 210 by using an electrically conductive metal such as tungsten or titanium. The plug 220 is formed by a sputtering method or a CVD method. The plug 220 is electrically connected to the connecting terminal 205. Thus, the first signal is applied to the first bottom electrode 251, to the second bottom electrode 252, and to the third bottom electrode 253 which are successively formed through the electrical wiring, the connecting terminal 205, and the plug 220.

A sacrificial layer 225 is overlayed on the etch stop layer 215 and on the plug 220 by using PSG. The sacrificial layer 225 is formed by a APCVD method so that the sacrificial layer 225 has a thickness of between about 1.0 μm and 2.0 μm. In this case, the degree of flatness of the sacrificial layer 225 is poor because the sacrificial layer 225 covers the top of the substrate 200 having the electrical wiring and the connecting terminal 205. Therefore, the surface of the sacrificial layer 225 is planarized by using a SOG or by a CMP method. Subsequently, with regard to positions where the first actuating portion 281 and the second actuating portion 282 are respectively formed, a first portion of the sacrificial layer 225 under which the connecting terminal 205 is formed and a second portion of the sacrificial layer 225 which is adjacent to the first portion of the sacrificial layer 225, are patterned in order to expose a first portion of the etch stop layer 215 where the plug 220 is formed and a second portion of the etch stop layer 215 which is adjacent to the first portion of the etch stop layer 215.

Figure 17A:
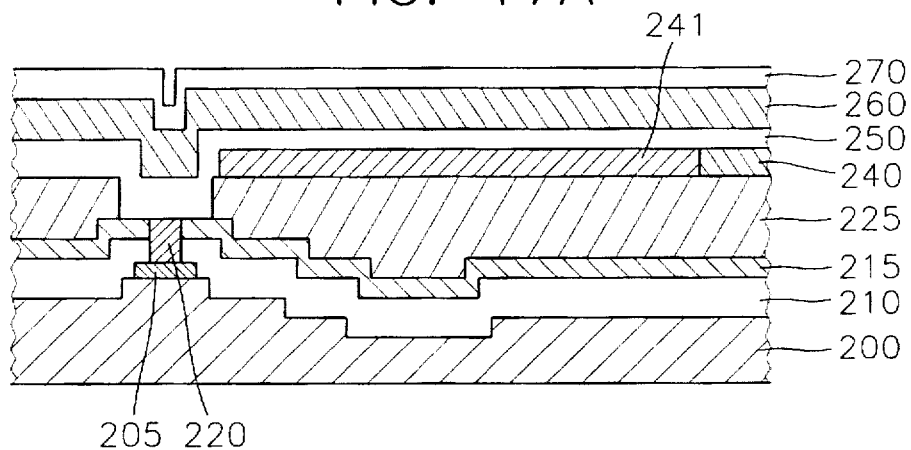
Figure 17B:
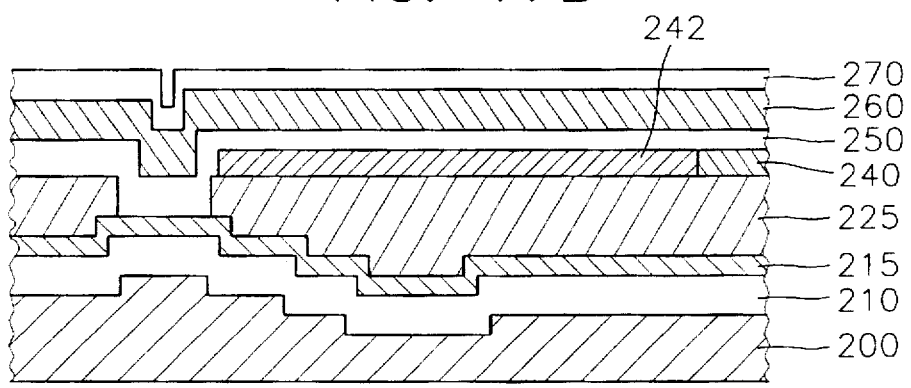
Figure 17C:
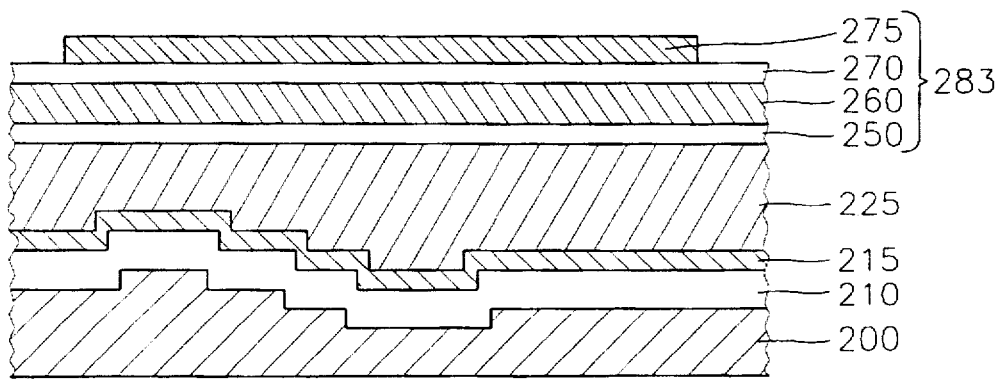

FIG. 17A illustrates manufacturing steps of the first actuating portion 281, FIG. 17B illustrates manufacturing steps of the second actuating portion 282, and FIG. 17C illustrates manufacturing steps of the third actuating portion 283.

Referring to FIGS. 17A to 17C, after a first photo resist 240 is coated on the sacrificial layer 225, the first photo resist 240 is patterned so as to expose third portions of the sacrificial layer 225 which are adjacent to the exposed first and second portions of the etch stop layer 215. After a first supporting layer is formed on third portions of the sacrificial layer 225 by using a rigid material, for example a nitride or a metal, the first supporting layer is patterned so as to form the first bottom supporting layer 241 and the second bottom supporting layer 242. The first supporting layer is formed by a LPCVD method so that the first supporting layer has a thickness of between about 0.1 μm and 1.0 μm. When the first supporting layer is patterned, the first bottom supporting layer 241 and the second bottom supporting layer 242 are respectively formed only beneath the first bottom electrode 251 and beneath the second bottom electrode 252 which are successively formed by means of exact patterning the first supporting layer.

A bottom electrode layer 250 is overlayed on the exposed first and second portions of the etch stop layer 215, on the first bottom supporting layer 241, on the second bottom supporting layer 242, and on the sacrificial layer 225. The bottom electrode layer 250 is formed by using an electrically conductive metal such as platinum, tantalum, or platinum-tantalum. The bottom electrode layer 250 is formed by a sputtering method or a CVD method so that the bottom electrode layer 250 has a thickness of between about 500 Å and 2000 Å. The bottom electrode layer 250 is patterned so as to form the first bottom electrode 251, the second bottom electrode 252, and the third bottom electrode 253.

An active layer 260 is overlayed on the bottom electrode layer 250. The active layer 260 is formed by using a piezoelectric material such as ZnO, PZT, or PLZT so that the active layer 260 has a thickness of between about 0.1 μm and 1.0 μm. Also, the active layer 260 is formed by using an electrostrictive material such as PMN. After the active layer 260 is formed by a sol-gel method, a sputtering method, or a CVD method, the active layer 260 is annealed by a RTA method. Then, the active layer 260 is polled. When the active layer 260 is manufactured by using ZnO, the active layer 260 is formed at low temperature of between 300° C. and 600° C. In addition, the polling step is needless when the active layer 150 is manufactured by using ZnO because the active layer 150 comprised of ZnO is polled by an electric field generated according to the first signal and a second signal. Hence, a thermal attack to the substrate 200 may be decreased. The active layer 260 will be patterned so as to form the first active layer 261, the second active layer 262, and the third active layer 263.

A top electrode layer 270 is overlayed on the active layer 260. The top electrode layer 270 is formed by using a metal having an electrical conductivity and a reflectivity, for example aluminum, platinum, or silver. The top electrode layer 270 is formed by a sputtering method, or a CVD method so that the top electrode layer 270 has a thickness of between about 500 Å and 2000 Å. The top electrode layer 270 is patterned so as to form the first top electrode 271, the second top electrode 272, and the third top electrode 273.

After a second supporting layer is overlayed on the top electrode layer 270 by using a rigid material such as a nitride or a metal, the second supporting layer is patterned so as to form the top supporting layer 275. In this case, the top supporting layer 275 is patterned to be formed only on the third top electrode 273 which is formed successively by patterning the top electrode layer 270.

Figure 18A:
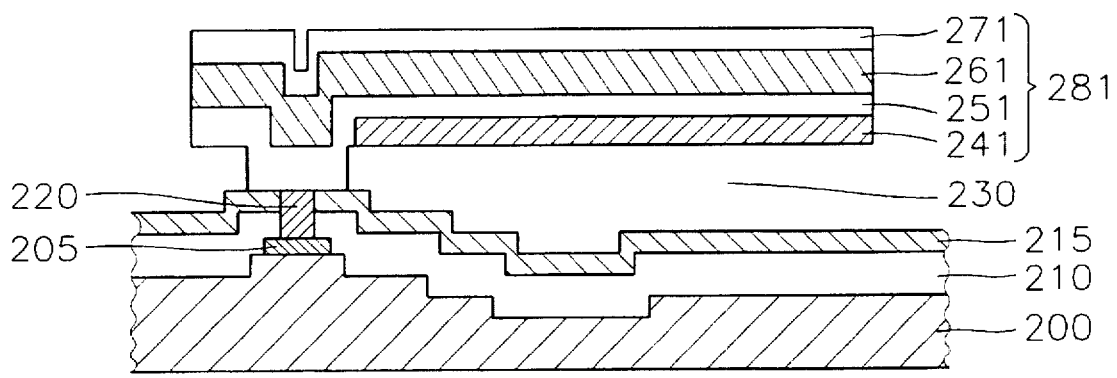
Figure 18B:
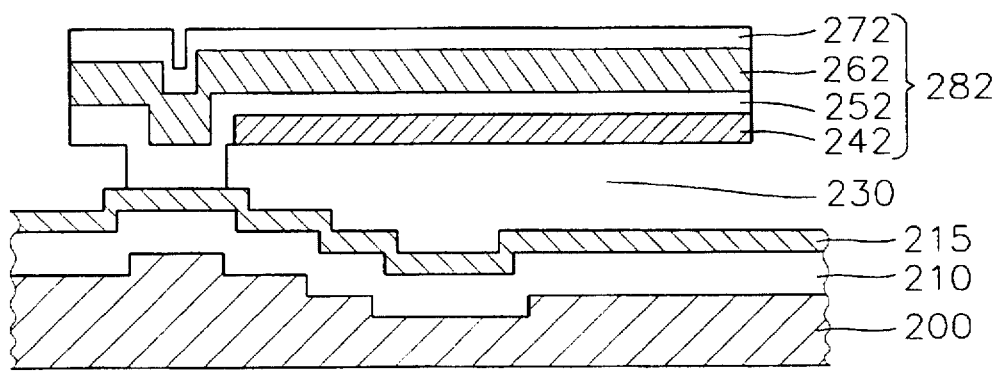
Figure 18C:
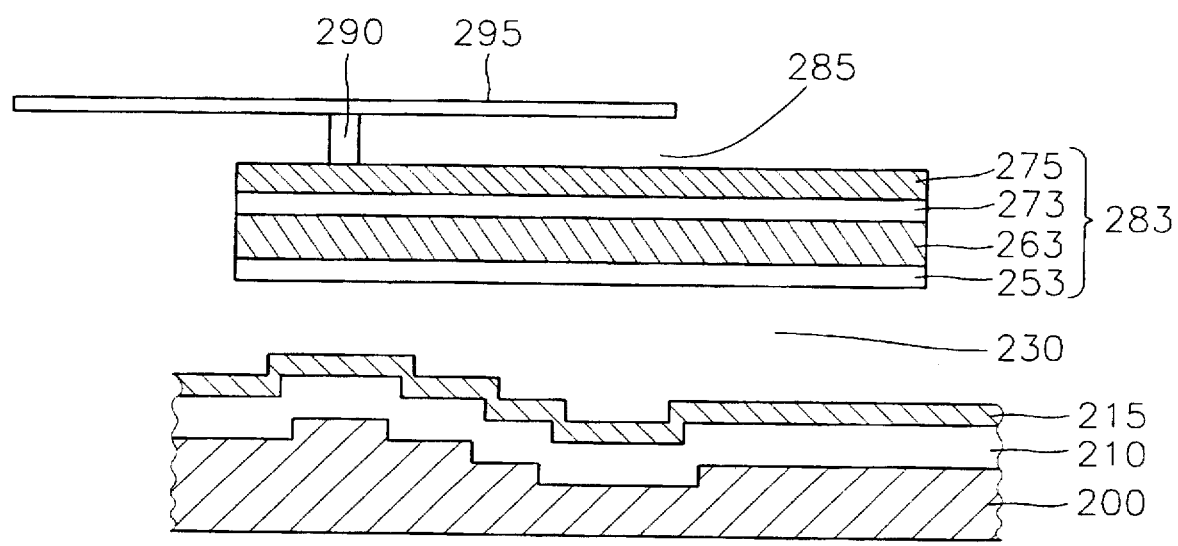

FIG. 18A illustrates manufacturing steps of the first actuating portion 281, FIG. 18B illustrates manufacturing steps of the second actuating portion 282, and FIG. 18C illustrates manufacturing steps of the third actuating portion 283.

Referring to FIGS. 18A to 18C, after a second photo resist (not shown) is coated on the top electrode layer 270 and on the top supporting layer 275, the top electrode layer 270 is patterned so as to form the first top electrode 271, the second top electrode 272, and the third top electrode 273 by using the second photo resist as an etching mask. At that time, the first top electrode 271, the second top electrode 272, and the third top electrode 273 are connected one after another. The first top electrode 271 has a rectangular shape, the second top electrode has a rectangular shape, and the third top electrode has a T-shape, so the first top electrode 271, the second top electrode 272, and the third top electrode 273 together have a shape of two U's parallely combined. The second signal is applied to the first top electrode 271, to the second top electrode 272, and to the third top electrode 273 from a common line (not shown). The second signal is a bias current signal.

The active layer 260 and the bottom electrode layer 250 are patterned by the same method as that of the top electrode layer 270. The active layer 260 is patterned so as to form the first active layer 261, the second active layer 262, and the third active layer 263. The first active layer 261, the second active layer 262, and the third active layer 263 have the same shapes as those of the first top electrode 271, the second top electrode 272, and the third top electrode 273. The bottom electrode layer 250 is patterned so as to form the first bottom electrode 251, the second bottom electrode 252, and the third bottom electrode 253. The first bottom electrode 251, the second bottom electrode 252, and the third bottom electrode 253 also have the same shapes as those of the first top electrode 271, the second top electrode 272, and the third top electrode 273. The first signal is applied to the first bottom electrode 251, to the second bottom electrode 252, and to the third bottom electrode 253 via the electrical wiring, the connecting terminal 205, and the plug 220. Therefore, when the first signal is applied to the first bottom electrode 251, to the second bottom electrode 252, and to the third bottom electrode 253, at the same time, the second signal is applied to the first top electrode 271, to the second top electrode 272, and to the third top electrode 273, electric fields are respectively generated between the first top electrode 271 and the first bottom electrode 251, between the second top electrode 272 and the second bottom electrode 252, and between the third top electrode 273 and the third bottom electrode 253. The first active layer 261, the second active layer 262, and the third active layer 263 are respectively deformed by such electric fields.

Subsequently, the sacrificial layer 225 and the first photo resist 240 are removed by using a vapor of hydrogen fluoride. When the sacrificial layer 225 and the first photo resist 240 are removed, the first air gap 230 is formed at the position where the sacrificial layer 225 is positioned. Hence, the first actuating portion 281, the second actuating portion 282, and the third actuating portion 283 are completed.

Referring to FIG. 18C, after a third photo resist (not shown) is coated on the first actuating portion 281, on the second actuating portion 282, and on the third actuating portion 283, the third photo resist is patterned in order to expose a portion of the top supporting layer 275. The post 290 is formed on the exposed portion of the top supporting layer 275 and the reflecting member 295 is formed on the post 290 and on the third photo resist. The post 290 and the reflecting member 295 are formed by using a reflective metal such as aluminum, platinum, or silver. The post 290 and the reflecting member 295 are formed by a sputtering method or a CVD method. The reflecting member 295 has a thickness of between about 500 Å and 1000 Å. Preferably, the reflecting member 295 is a mirror. The third photo resist is removed by stripping. When the third photo resist is removed, the second air gap 285 is formed at the position where the third photo resist is positioned. The reflecting member 295 has a plate shape. A central portion of the reflecting member 295 is supported by the post 290. The first portion of the reflecting member 295 is parallelly formed above the top supporting layer 275. The second air gap 285 is interposed between the top supporting layer 275 and the first portion of the reflecting member 295. The second portion of the reflecting member 295 is formed to cover the adjacent actuator. Hence, the actuator 280 on which the reflecting member 295 is formed is completed.

The operation of thin film AMA in an optical projection system according to the present embodiment of the present invention will be described.

In the thin film AMA according to the present embodiment, the first signal, that is the picture current signal, is applied to the first bottom electrode 251 via the electrical wiring, the connecting terminal 205, and the plug 220 from outside. The first signal is also applied to the second bottom electrode 252 and to the third bottom electrode 253 which are connected to the first bottom electrode 251. At the same time, the second signal, namely the bias current signal, is applied to the first top electrode 271 from the common line and the second signal is also applied to the second top electrode 272 and to the third top electrode 273 which are connected to the first top electrode 271. Thus, electric fields are respectively generated between the first top electrode 271 and the first bottom electrode 251, between the second top electrode 272 and the second bottom electrode 252, and between the third top electrode 273 and the third bottom electrode 253. The first active layer 261 which is formed between the first top electrode 271 and the first bottom electrode 251, the second active layer 262 which is formed between the second top electrode 272 and the second bottom electrode 252, and the third active layer 263 which is formed between the third top electrode 273 and the third bottom electrode 253 are deformed by such electric fields. The first active layer 261, the second active layer 262, and the third active layer 263 are respectively deformed in a direction perpendicular to electric fields. In this case, the first active layer 261 is actuated in the opponent direction about the position where the first bottom supporting layer 241 is positioned. The second active layer 262 is actuated in a direction away from the position where the second bottom supporting layer 242 is positioned. The third active layer 263 is actuated in a direction away from the position where the top supporting layer 275 is positioned. That is, the first active layer 261 and the second active layer 262 are actuated upward and the third active layer 263 is actuated downward. The tilting angle of the first active layer 261 is equal to that of the second active layer 262. Also, the tilting angle of the first active layer 261 is equal to that of the third active layer 263.

If the tilting angle of the first active layer 261 is θ, the first actuating portion 281 having the first active layer 261 is actuated upward by a tilting angle of θ. At the same time, the second actuating portion 282 having the second active layer 262 is actuated upward by a tilting angle of θ. Also, the third actuating portion 283 having the third active layer 263 is actuated downward by a tilting angle of θ. When the first actuating portion 281 and the second actuating portion 282 are actuated upward, the third actuating portion 283 connected to the first actuating portion 281 and to the second actuating portion 282 is actuated upward together with the first actuating portion 281 and the second actuating portion 282. At this state, the third actuating portion 283 having the third active layer 263 is actuated downward by a tilting angle of θ because the third active layer 263 is actuated downward. Therefore, the final tilting angle of the third actuating portion 283 is equal to 2 θ. The reflecting member 295 reflecting a incident light from the light source tilts with the angle of 2 θ because the reflecting member 295 is formed on the third actuating portion 283.

Embodiment 3

Figure 19:
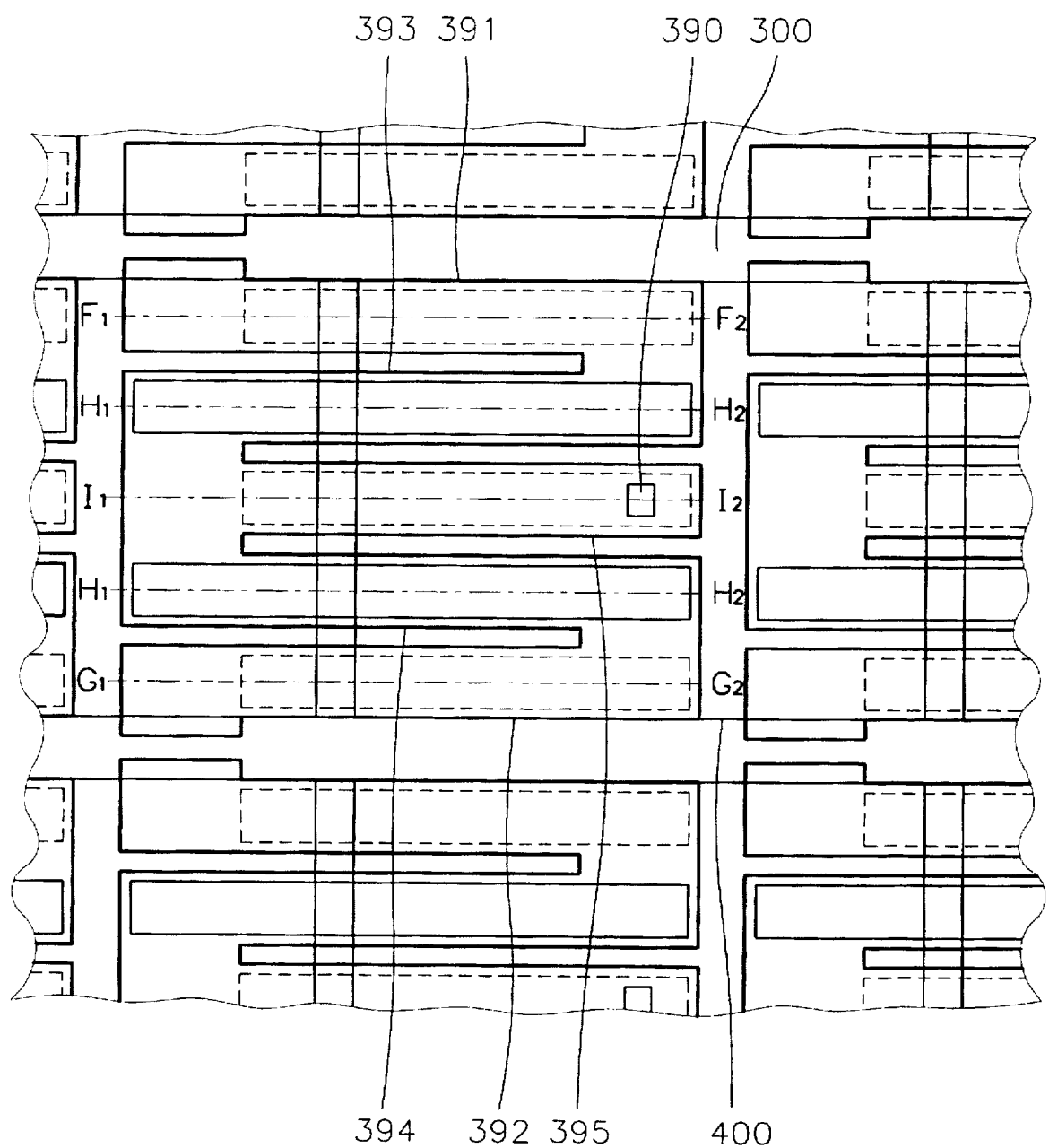
FIG. 19 is a plan view for showing a thin film AMA in an optical projection system according to a third embodiment of the present invention.
Figure 20:
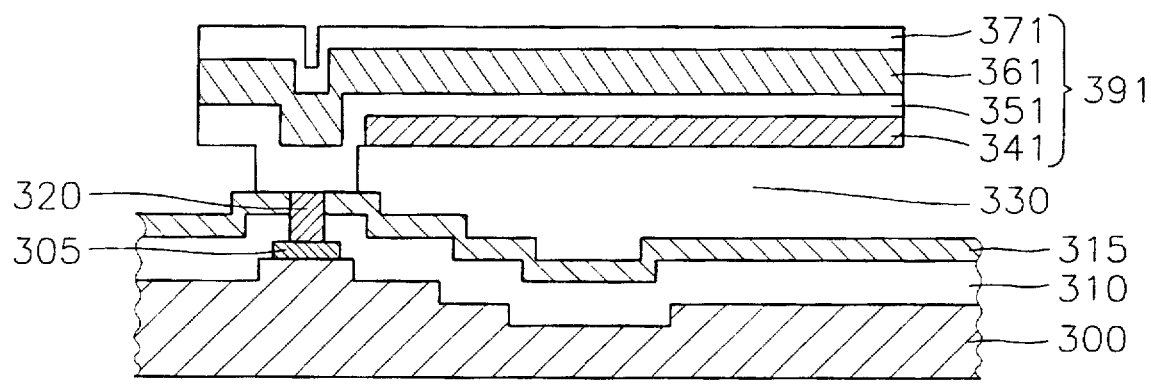
FIG. 20 is a cross sectional view taken along line $F_1$–$F_2$ of FIG. 19.
Figure 21:
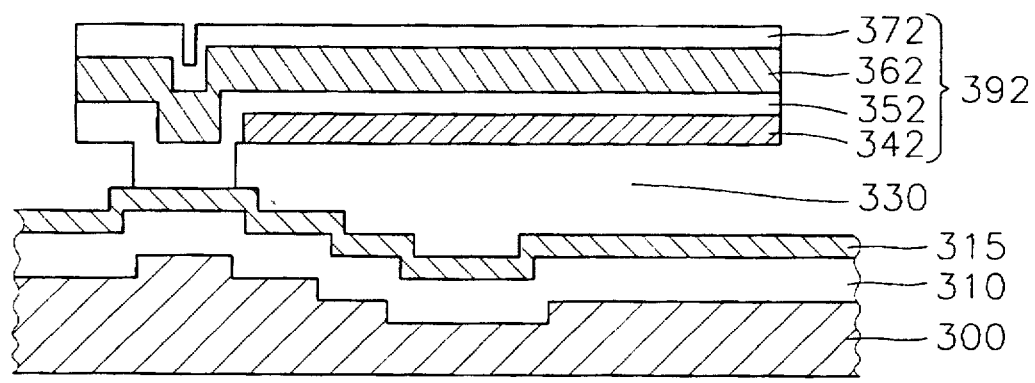
FIG. 21 is a cross sectional view taken along line $G_1$–$G_2$ of FIG. 19.
Figure 22:
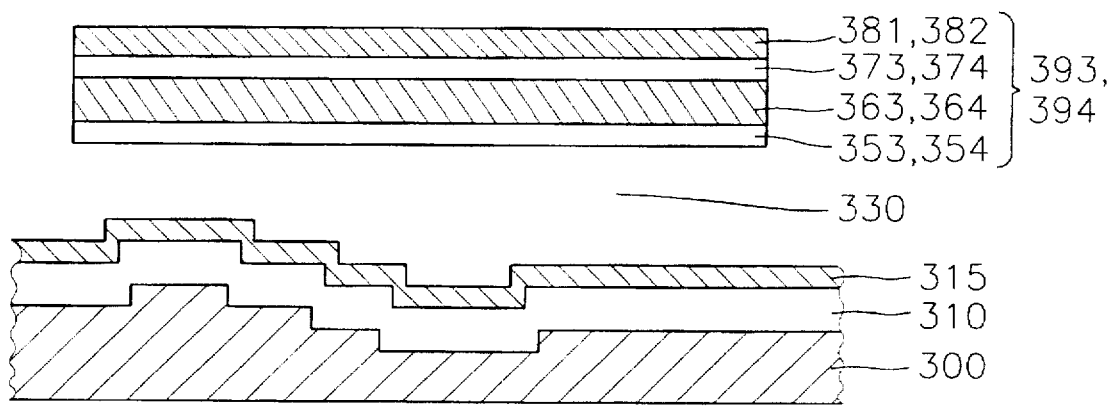
FIG. 22 is a cross sectional view taken along line $H_1$–$H_2$ of FIG. 19.
Figure 23:
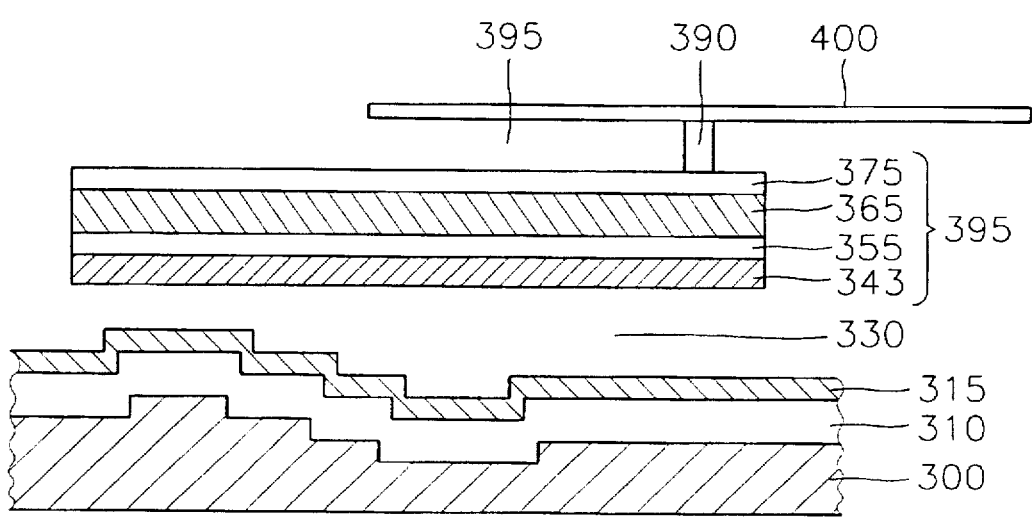
FIG. 23 is a cross sectional view taken along line $I_1$–$I_2$ of FIG. 19.

FIG. 19 is a plan view for showing thin film AMA in an optical projection system according to a third embodiment of the present invention. FIG. 20 is a cross sectional view taken along line $F_1$-$F_2$ of FIG. 19. FIG. 21 is a cross sectional view taken along line $G_1$-$G_2$ of FIG. 19. FIG. 22 is a cross sectional view taken along line $H_1$-$H_2$ of FIG. 19, and FIG. 23 is a cross sectional view taken along line $I_1$-$I_2$ of FIG. 19.

Referring to FIG. 19, the thin film AMA according to the present embodiment, has an substrate 300, an actuator 390 formed on the substrate 300, and a reflecting member 400 installed on the actuator 390.

The actuator 390 has a first actuating portion 391 formed on a first portion of the substrate 300, a second actuating portion 392 formed on a second portion of the substrate 300, a third actuating portion 393 integrally formed with the first actuating portion 391, a fourth actuating portion 394 integrally formed with the second actuating portion 392, and a fifth actuating portion 394 integrally formed with the third actuating portion 393 and with the fourth actuating portion 394 between the third actuating portion 393 and the fourth actuating portion 394.

The first actuating portion 391 and the second actuating portion 392 are parallely formed each other, and the third actuating portion 393 having an L-shape is connected to the first actuating portion 391. The fourth actuating portion 394 having a reverse L-shape is connected to the second actuating portion 392. The fifth actuating portion 395 having a T-shape is connected to the third actuating portion 393 and to the fourth actuating portion 394. Hence, the actuator 390 having the first actuating portion 391, the second actuating portion 392, the third actuating portion 393, the fourth actuating portion 394, and the fifth actuating portion 395, has a shape of U, T, and U parrallely combined.

The reflecting member 400 is supported by a post 395 formed on a first potion of the fifth actuating portion 395. The actuator 390 is covered with the reflecting member 400. Preferably, the reflecting member 400 is a mirror.

Referring to FIG. 20, the substrate 300 in which an electrical wiring (not shown) is formed has a connecting terminal 305 formed on the electrical wiring, a passivation layer 310 overlayed on the substrate 300 and on the connecting terminal 305, an etch stop layer 315 overlayed on the passivation layer 310, and a plug 320 formed on the connecting terminal 305 through the passivation layer 310 and the etch stop layer 315.

The first actuating portion 391 has a first bottom electrode 351 having a bottom of a first portion attached to a portion of the etch stop layer 315 under which the plug 320 and the connecting terminal 305 are formed and having a second portion parallelly formed above the etch stop layer 315, a first bottom supporting layer 341 attached to the bottom of the second portion of the first bottom electrode 351, a first active layer 361 formed on the first bottom electrode 351, and a first top electrode 371 formed on the first active layer 361. A first air gap 330 is interposed between the etch stop layer 315 and the second portion of the first bottom electrode 351.

The second actuating portion 392 has the same shape as that of the first actuating portion 391 except for a position where a second bottom electrode 352 is attached to the etch stop layer 315. Referring to FIG. 21, the second actuating portion. 392 has a second bottom electrode 352 having a bottom of a first portion attached to a portion of the etch stop layer 315 adjacent to the portion under which the plug 320 and the connecting terminal 305 are formed and having a second portion parallelly formed above the etch stop layer 315, a second bottom supporting layer 342 attached to the bottom of the second portion of the second bottom electrode 352, a second active layer 362 formed on the second bottom electrode 352, and a second top electrode 372 formed on the second active layer 362. The first air gap 330 is interposed between the etch stop layer 315 and the second portion of the second bottom electrode 352.

The third actuating portion 393 and the fourth actuating portion 394 have the same shapes. Referring to FIG. 22, the third actuating portion 393 has a third bottom electrode 353 parallelly formed above the etch stop layer 315, a third active layer 363 formed on the third bottom electrode 353, a third top electrode 373 formed on the third active layer 363, and a first top supporting layer 381 formed on the third top electrode 373. The first air gap 330 is interposed between the etch stop layer 315 and the third bottom electrode 353. The third bottom electrode 353 of the third actuating portion 393 is integrally formed with the first bottom electrode 351 and the third active layer 363 of the third actuating portion 393 is integrally formed with the first active layer 361. Also, the third top electrode 373 of the third actuating portion 393 is integrally formed with the first top electrode 371.

The fourth actuating portion 394 has a fourth bottom electrode 354 parallelly formed above the etch stop layer 315, a fourth active layer 364 formed on the fourth bottom electrode 354, a fourth top electrode 374 formed on the fourth active layer 364, and a second top supporting layer 382 formed on the fourth top electrode 374. The first air gap 330 is interposed between the etch stop layer 315 and the fourth bottom electrode 354. The fourth bottom electrode 354 of the fourth actuating portion 394 is integrally formed with the second bottom electrode 352 and the fourth active layer 364 of the fourth actuating portion 394 is integrally formed with the second active layer 362. Also, the fourth top electrode 374 of the fourth actuating portion 394 is integrally formed with the second top electrode 372.

Referring to FIG. 23, the fifth actuating portion 395 has a third bottom supporting layer 343 parallelly formed above the etch stop layer 315, a fifth bottom electrode 355 formed on the third bottom supporting layer 343, a fifth active layer 365 formed on the fifth bottom electrode 355, and a fifth top electrode 375 formed on the fifth active layer 365. The first air gap 330 is interposed between the etch stop layer 315 and the third bottom supporting layer 343. The fifth bottom electrode 355 of the fifth actuating portion 395 is integrally formed with the third bottom electrode 353 and with the fourth bottom electrode 354, and the fifth active layer 365 of the fifth actuating portion 395 is integrally formed with the third active layer 363 and with the fourth active layer 364. Also, the fifth top electrode 375 of the fifth actuating portion 395 is integrally formed with the third top electrode 373 and with the fourth top electrode 374.

The post 390 is formed on a first portion of the fifth top electrode 375 of the fifth actuating portion 395. A central portion of the reflecting member 400 is supported by the post 390. A first portion of the reflecting member 400 is parallel above the fifth top electrode 375. A second air gap 395 is interposed between the fifth top electrode 375 and the first portion of the reflecting member 400. A second portion of the reflecting member 400 covers above a portion of adjacent actuator. Preferably, the reflecting member 400 has a rectangular shape.

In the thin film AMA in an optical projection system according to the present embodiment, methods for manufacturing the first actuating portion 391 and the second actuating portion 392 are the same as those of the second embodiment of the present invention shown in FIGS. 17A to 17B. Methods for manufacturing the third actuating portion 393 and the fourth actuating portion 394 are the same as those of the second embodiment of the present invention shown in FIG. 17C. In addition, the method for manufacturing the fifth actuating portion 395 is the same as that of the second embodiment of the present invention shown in FIG. 18C, except for positions of the supporting layer and the reflecting member.

The operation of thin film AMA in the optical projection system according to the present embodiment will be described.

In the thin film AMA according to the present embodiment, the first active layer 361, the second active layer 362, the third active layer 363, the fourth active layer 364, and the fifth active layer 365 are actuated by following the same steps as those of the second embodiment. The first active layer 361 is actuated in a direction away from the position where the first bottom supporting layer 341 is positioned. The second active layer 362 is actuated in a direction away from the position where the second bottom supporting layer 342 is positioned. The third active layer 363 is actuated in a direction away from the position where the first top supporting layer 381 is positioned. The fourth active layer 364 is actuated in a direction away from the position where the second top supporting layer 382 is positioned. The fifth active layer 365 is actuated in a direction away from the position where the third bottom supporting layer 383 is positioned. That is, the first active layer 361, the second active layer 362, and fifth active layer 365 are actuated upward. However, the third active layer 363 and the fourth active layer 364 are actuated downward. The tilting angle of the first active layer 361 is equal to that of other active layers 362, 363, 364 and 365.

If the tilting angle of the first active layer 361 is $\theta$, the first actuating portion 391 having the first active layer 361 and the second actuating portion 392 having the second active layer 362, respectively are actuated upward by a tilting angle of $\theta$. At the same time, the fifth actuating portion 395 having the fifth active layer 365 are actuated upward by a tilting angle of $\theta$. Also, the third actuating portion 393 having the third active layer 363 and the fourth actuating portion 394 having the fourth active layer 364 respectively are actuated downward by a tilting angle of $\theta$. When the first actuating portion 391 and the second actuating portion 392 are actuated upward, the third actuating portion 393 connected to the first actuating portion 391 and the fourth actuating portion 394 connected to the second actuating portion 392 are actuated upward together with the first actuating portion 391 and with the second actuating portion 392. At this state, the third actuating portion 393 having the third active layer 363 and the fourth actuating portion 394 having the fourth actuating portion 364 are actuated downward by a tilting angle of $\theta$ because the third active layer 363 and the fourth active layer 364 respectively are actuated downward. At that time, the fifth actuating portion 395 is actuated upward again by a tilting angle of $\theta$ because the fifth active layer 365 is actuated upward. Therefore, the final tilting angle of the fifth actuating portion 395 is equal to 3 $\theta$. The reflecting member 400 reflecting an incident light from a light source tilts by an angle of 3 $\theta$ because the reflecting member is 400 is formed on the fifth actuating portion 395.

Concerning preferred embodiments of the present invention, a thin film AMA in an optical projection system having actuator which have seven actuating portions in order to have a tilting angle of 4 $\theta$ can be produced. Also, a thin film AMA having actuator which have nine actuating portions in order to have a tilting angle of 5 $\theta$ can be produced. Furthermore, a thin film AMA having actuator which have more than nine actuating portions in order to have a tilting angle more than 4 $\theta$ can be produced according to the above described method.

Therefore, the thin film AMA in an optical projection system according to the present invention has a reflecting member and actuator including a plurality of actuating portions in which adjacent actuating portions are actuated in opponent directions one after another, so the tilting angle of reflecting members installed on actuators is two or three times bigger than that of the conventional thin film AMA, even though the thin film AMA according to the present invention has a small volume. Hence, the light efficiency of the light reflected by the reflecting member increases and the contrast of the picture projected onto a screen also increases. Furthermore, the distance between the light source and the screen is wider because the tilting angle of the reflecting member is bigger.

Although preferred embodiments of the present invention have been described, it is understood that the present invention should not be limited to these preferred embodiments, but various changes and modifications can be made by one skilled in the art within the spirit and scope of the invention as hereinafter claimed.

What is claimed is:

1. A thin film actuated mirror array in an optical projection system being actuated by a first signal and a second signal, said thin film actuated mirror array in an optical projection system comprising:

a substrate having an electrical wiring and a connecting terminal for receiving the first signal from outside and for transmitting the first signal;

an actuator comprising a first actuating portion having i) a first bottom electrode for receiving the first signal, said first bottom electrode being formed on said substrate, ii) a first top electrode corresponding to said first bottom electrode for receiving the second signal and generating an electric field between said first top electrode and said first bottom electrode, iii) a first active layer formed between said first top electrode and said first bottom electrode and deformed by the electric field, and iv) a bottom supporting layer formed beneath said first bottom electrode, and a second actuating portion connected to said first actuating portion having a) a second bottom electrode integrally formed with said first bottom electrode, b) a second top electrode corresponding to said second bottom electrode for receiving the second signal and generating an electric field between said second top electrode and said second bottom electrode, said second top electrode being integrally formed with said first top electrode c) a second active layer formed between said second top electrode and said second bottom electrode and deformed by the electric field, said second active layer being integrally formed with said first active layer, and d) a top supporting layer formed on said second top electrode, said second actuating portion being actuated in an opposite direction from said first actuating portion; and a reflecting means for reflecting a light, said reflecting means being formed on said second actuating portion.

2. The thin film actuated mirror array in an optical projection system as claimed in claim 1, wherein said first bottom electrode and said second bottom electrode are comprised of an electrically conductive metal, said first active layer and said second active layer are comprised of a piezoelectric material or an electrostrictive material, and said first top electrode and said second top electrode are comprised of an electrically conductive metal.

3. The thin film actuated mirror array in an optical projection system as claimed in claim 1, wherein said first bottom electrode and said second bottom electrode are comprised of platinum, tantalum, or platinum-tantalum, said first active layer and said second active layer are comprised of Pb(Zr, Ti)O$_3$, (Pb, La)(Zr, Ti)O$_3$, or Pb(Mn, Nb)O$_3$, and said first top electrode and said second top electrode are comprised of aluminum, platinum, or silver.

4. The thin film actuated mirror array in an optical projection system as claimed in claim 1, wherein said first active layer and said second active layer are comprised of ZnO.

5. The thin film actuated mirror array in an optical projection system as claimed in claim 1, wherein said bottom supporting layer and said top supporting layer are comprised of a rigid material.

6. The thin film actuated mirror array in an optical projection system as claimed in claim 5, wherein said bottom supporting layer and said top supporting layer are comprised of a metal or a nitride.

7. The thin film actuated mirror array in an optical projection system as claimed in claim 1, wherein said second actuating portion further comprises a post for supporting said reflecting means, said post being formed on a portion of said top supporting layer, and said reflecting means is comprised of a reflective metal.

8. The thin film actuated mirror array in an optical projection system as claimed in claim 7, wherein said reflecting means is comprised of aluminum, platinum, or silver.

9. The thin film actuated mirror array in an optical projection system as claimed in claim 1, wherein said actuator has a U-shape.

10. A thin film actuated mirror array in an optical projection system being actuated by a first signal and a second signal, said thin film actuated mirror array in an optical projection system comprising:

a substrate having an electrical wiring and a connecting terminal for receiving the first signal from outside and for transmitting the first signal;

an actuator comprising a first actuating portion formed on a first portion of said substrate having a first bottom electrode for receiving the first signal, a first top electrode corresponding to said first bottom electrode for receiving the second signal and generating an electric field between said first top electrode and said first bottom electrode, a first active layer being formed between said first top electrode and said first bottom electrode, said first active layer being deformed by the electric field, and a first bottom supporting layer formed beneath said first bottom electrode; a second actuating portion formed on a second portion of said substrate having a second bottom electrode for receiving the first signal, a second top electrode corresponding to said second bottom electrode for receiving the second signal and generating an electric field between said second top electrode and said second bottom electrode, a second active layer formed between said second top electrode and said second bottom electrode, said second active layer being deformed by the electric field, and a second bottom supporting layer formed beneath said second bottom electrode, said second actuating portion being actuated in the same direction as that of said first actuating portion; and a third actuating portion integrally formed between said first actuating portion and said second actuating portion having a third bottom electrode for receiving the first signal, said third bottom electrode being integrally formed with said first bottom electrode and with said second bottom electrode, a third top electrode corresponding to said third bottom electrode for receiving the second signal and generating an electric field between said third top electrode and said third bottom electrode, said third top electrode being integrally formed with said first top electrode and with said second top electrode, a third active layer formed between said third top electrode and said third bottom electrode and deformed by the electric field, said third active layer being integrally formed with said first active layer and with said second active layer, and a top supporting layer formed on said third top electrode, said third actuating portion being actuated in an opposite direction from said first actuating portion; and a reflecting means for reflecting a light, said reflecting means being formed on said third actuating portion.

11. The thin film actuated mirror array in an optical projection system as claimed in claim 10, wherein said first bottom electrode, said second bottom electrode, and said third bottom electrode are comprised of an electrically conductive metal, said first active layer, said second active layer, and said third active layer are comprised of a piezoelectric material or an electrostrictive material, and said first top electrode, said second top electrode, and said third top electrode are comprised of an electrically conductive metal.

12. The thin film actuated mirror array in an optical projection system as claimed in claim 10, wherein said first bottom electrode, said second bottom electrode, and said third bottom electrode are comprised of platinum, tantalum, or platinum-tantalum, said first active layer, said second active layer, and said third active layer are comprised of Pb(Zr, Ti)O$_3$, (Pb, La)(Zr, Ti)O$_3$, or Pb(Mn, Nb)O$_3$, and said first top electrode, said second top electrode, and said third top electrode are comprised of aluminum, platinum, or silver.

13. The thin film actuated mirror array in an optical projection system as claimed in claim 10, wherein said first active layer, said second active layer and said third active layer are comprised of ZnO.

14. The thin film actuated mirror array in an optical projection system as claimed in claim 10, wherein said first bottom supporting layer, said second bottom supporting layer and said top supporting layer are comprised of a rigid material.

15. The thin film actuated mirror array in an optical projection system as claimed in claim 10, wherein said first bottom supporting layer, said second bottom supporting layer and said top supporting layer are comprised of a metal or a nitride.

16. The thin film actuated mirror array in an optical projection system as claimed in claim 10, wherein said third actuating portion further comprises a post formed on a portion of said top supporting layer, and said reflecting means is comprised of a reflective metal.

17. The thin film actuated mirror array in an optical projection system as claimed in claim 10, wherein said actuator has a shape of two U's parallely combined.

18. A thin film actuated mirror array in an optical projection system being actuated by a first signal and a second signal, said thin film actuated mirror array in an optical projection system comprising:

a substrate having an electrical wiring and a connecting terminal for receiving the first signal from outside and for transmitting the first signal;

an actuator comprising a first actuating portion formed on a first portion of said substrate having a first bottom electrode for receiving the first signal, a first top electrode corresponding to said first bottom electrode for receiving the second signal and generating an electric field between said first top electrode and said first bottom electrode, a first active layer formed between said first top electrode and said first bottom electrode and deformed by the electric field, and a first bottom supporting layer formed beneath said first bottom electrode; a second actuating portion formed on a second portion of said substrate having a second bottom electrode for receiving the first signal, a second top electrode corresponding to said second bottom electrode for receiving the second signal and generating an electric field between said second top electrode and said second bottom electrode, a second active layer formed between said second top electrode and said second bottom electrode and deformed by the electric field, and a second bottom supporting layer formed beneath said second bottom electrode, said second actuating portion being actuated in the same direction as that of said first actuating portion; a third actuating portion integrally formed with said first actuating portion having a third bottom electrode for receiving the first signal, said third bottom electrode being integrally formed with said first bottom electrode, a third top electrode corresponding to said third bottom electrode for receiving the second signal and generating an electric field between said third top electrode and said third bottom electrode, said third top electrode being integrally formed with said first top electrode, a third active layer formed between said third top electrode and said bottom electrode and actuated by the electric field, said third active layer being integrally formed with said first active layer, and a first top supporting layer formed on said third top electrode, said third actuating portion being actuated in an opposite direction from said first actuating portion; a fourth actuating portion integrally formed with said second actuating portion having a fourth bottom electrode for receiving the first signal, said fourth bottom electrode being integrally formed with said second bottom electrode, a fourth top electrode corresponding to said fourth bottom electrode for receiving the second signal and generating an electric field between said fourth top electrode and said fourth bottom electrode, said fourth top electrode being integrally formed with said second top electrode, a fourth active layer formed between said fourth top electrode and deformed by the electric field, said fourth active layer being integrally formed with said second active layer, and a second top supporting layer formed on said fourth top electrode, said fourth actuating portion being actuated in the opponent direction about said second actuating portion; and a fifth actuating portion integrally formed between said third actuating portion and said fourth actuating portion having a fifth bottom electrode for receiving the first signal, said fifth bottom electrode being integrally formed with said third bottom electrode and with said fourth bottom electrode, a fifth top electrode corresponding to said fifth bottom electrode for receiving the second signal and generating an electric field between said fifth top electrode and said fifth bottom electrode, said fifth top electrode being integrally formed with said third top electrode and with said fourth top electrode, a fifth active layer formed between said fifth top electrode and said fifth bottom electrode and deformed by the electric field, said fifth active layer being integrally formed with said third active layer and with said fourth active layer, and a third bottom supporting layer formed beneath said fifth bottom electrode, said fifth actuating portion being actuated in the same direction as that of said first actuating portion; and a reflecting means for reflecting a light, said reflecting means being formed on said fifth actuating portion.

19. Thin film actuated mirror array in an optical projection system as claimed in claim 18, wherein said first bottom electrode, said second bottom electrode, said third bottom electrode, said fourth bottom electrode, and said fifth bottom electrode are comprised of an electrically conductive metal, said first active layer, said second active layer, said third active layer, said fourth active layer, and said fifth active layer are comprised of a piezoelectric material or an electrostrictive material, and said first top electrode, said second top electrode, said third top electrode, said fourth top electrode, and said fifth top electrode are comprised of an electrically conductive metal, and said reflecting means is formed by a reflective metal.

20. The thin film actuated mirror array in an optical projection system as claimed in claim 18, wherein said first bottom supporting layer, said second bottom supporting layer, said third bottom supporting layer, said first top supporting layer and said second top supporting layer are comprised of a metal or a nitride.

21. The thin film actuated mirror array in an optical projection system as claimed in claim 18, wherein said first active layer, said second active layer, said third active layer, said fourth active layer, and said fifth active layer are comprised of ZnO, Pb(Zr, Ti)$O_3$, (Pb, La)(Zr, Ti)$O_3$, or Pb(Mn, Nb)$O_3$.

22. The thin film actuated mirror array in an optical projection system as claimed in claim 18, wherein said actuator has a shape of a U, a T, and a U parallely combined.

23. A method for manufacturing a thin film actuated mirror array in an optical projection system being actuated by first signal and a second signal, said method for manufacturing a thin film actuated mirror array in an optical projection system comprising the steps of:

provriding a substrate having an electrical wiring and a connecting terminal for receiving a first signal from outside and transmitting the first signal;

forming a first supporting layer on said substrate and patterning said first supporting layer to form a bottom supporting layer on a first portion of said substrate after forming a sacrificial layer on said substrate, planarizing said sacrificial layer by using a spin on glass or by a chemical mechanical polishing method and patterning said sacrificial layer in order to expose a portion of said substrate adjacent to said connecting terminal;

forming a bottom electrode layer, an active layer and a top electrode layer on said bottom supporting layer and on said substrate;

patterning said top electrode layer to form a first top electrode for receiving the second signal and generating an electrode field and to form a second top electrode for receiving the second signal and generating an electric field;

patterning said active layer to form a first active layer deformed by the electric field and to form a second active layer deformed by the electric field;

patterning said bottom electrode layer to form a first bottom electrode on said bottom supporting layer for receiving the first signal and to form a second bottom electrode on a second portion of said substrate for receiving the first signal;

forming a second support layer on said second top electrode above the second portions of said substrate and patterning said second supporting layer to form a top supporting layer on said second top electrode; and forming a reflecting means for reflecting a light on said top supporting layer.

24. The method for manufacturing a thin film actuated mirror array in an optical projection system as claimed in claim 23, wherein the steps of forming said first supporting layer and said second supporting layer are performed by a chemical vapor deposition method by using a metal or a nitride.

25. The method for manufacturing a thin film actuated mirror array in an optical projection system as claimed in claim 23, wherein the steps of forming said bottom electrode layer and said top electrode layer are performed by a sputtering method or a chemical vapor deposition method by using platinum, tantalum or platinum-tantalum.

26. The method for manufacturing a thin film actuated mirror array in an optical projection system as claimed in claim 23, wherein the step of forming said active layer is performed by a sol-gel method, a sputtering method, or a chemical vapor deposition method by using ZnO, Pb(Zr, Ti)O$_3$, (Pb, La)(Zr, Ti)O$_3$, or Pb(Mn, Nb)O$_3$.

27. The method for manufacturing a thin film actuated mirror array in an optical projection system as claimed in claim 23, wherein the step of forming said reflecting means is performed by a sputtering method or a chemical vapor deposition method by using aluminum, platinum, or silver.

* * * * *